US011841804B2

(12) United States Patent
Shinomiya et al.

(10) Patent No.: US 11,841,804 B2
(45) Date of Patent: Dec. 12, 2023

(54) INFORMATION PROCESSING DEVICE AND INFORMATION PROCESSING METHOD

(71) Applicant: SONY GROUP CORPORATION, Tokyo (JP)

(72) Inventors: Jun Shinomiya, Tokyo (JP); Kyosuke Yoshida, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 93 days.

(21) Appl. No.: 17/287,858

(22) PCT Filed: Oct. 10, 2019

(86) PCT No.: PCT/JP2019/039976
§ 371 (c)(1),
(2) Date: Apr. 22, 2021

(87) PCT Pub. No.: WO2020/090401
PCT Pub. Date: May 7, 2020

(65) Prior Publication Data
US 2021/0382830 A1    Dec. 9, 2021

(30) Foreign Application Priority Data
Oct. 30, 2018  (JP) ................................ 2018-203767

(51) Int. Cl.
*G06F 12/122*   (2016.01)
*G06F 12/02*    (2006.01)
(Continued)

(52) U.S. Cl.
CPC ........ *G06F 12/122* (2013.01); *G06F 12/0253* (2013.01); *G06F 12/0871* (2013.01); *G06F 12/123* (2013.01)

(58) Field of Classification Search
None
See application file for complete search history.

(56) References Cited

U.S. PATENT DOCUMENTS 5,343,455 A  *  8/1994  Takeuchi ............. G11B 7/0045
5,893,920 A  *  4/1999  Shaheen ............... G06F 12/121
                                                711/E12.07
(Continued)

FOREIGN PATENT DOCUMENTS

CN       103999058 A    8/2014
JP       2004-272479 A  9/2004
(Continued)

OTHER PUBLICATIONS

International Search Report and Written Opinion of PCT Application No. PCT/JP2019/039976, dated Jan. 7, 2020, 09 pages of ISRWO.

(Continued)

*Primary Examiner* — William E. Baughman
(74) *Attorney, Agent, or Firm* — CHIP LAW GROUP

(57) ABSTRACT

A configuration, in which access processing such as data recording from an external device to the archive device can be efficiently performed, is implemented. A data processing section that performs a data recording processing control on a library, which is a data storage section of the archive device is provided. The data processing section saves record data in the local cache section in response to an input of the data recording request from the external device to the library, and outputs a recording processing completion notification to the external device. Further, an elapsed time after the saving in the local cache section is measured, and after the saving in the local cache section, the record data is transferred from the local cache section to the library and recorded after a pre-specified postponement time elapses.

15 Claims, 15 Drawing Sheets

(51) Int. Cl.
*G06F 12/0871* (2016.01)
*G06F 12/123* (2016.01)

(56) References Cited

U.S. PATENT DOCUMENTS

| | | | | |
|---|---|---|---|---|
| 6,757,797 | B1* | 6/2004 | Kaiya | G06F 3/0601 |
| | | | | 711/114 |
| 7,076,605 | B1* | 7/2006 | Son | G06F 3/0611 |
| | | | | 711/E12.04 |
| 10,216,416 | B1* | 2/2019 | Dighe | G06F 3/0659 |
| 10,338,834 | B1* | 7/2019 | Dighe | G06F 3/0659 |
| 2003/0016602 | A1* | 1/2003 | Wada | G11B 20/10 |
| | | | | 369/47.33 |
| 2004/0210795 | A1* | 10/2004 | Anderson | G06F 11/1666 |
| | | | | 714/5.11 |
| 2008/0046657 | A1* | 2/2008 | Eichenberger | G06F 12/0862 |
| | | | | 711/137 |
| 2009/0237828 | A1* | 9/2009 | Hatabe | G11B 15/689 |
| | | | | 360/71 |
| 2011/0191544 | A1* | 8/2011 | Naga | G06F 12/122 |
| | | | | 711/E12.017 |
| 2013/0226870 | A1* | 8/2013 | Dash | G06F 11/2074 |
| | | | | 707/634 |
| 2014/0181374 | A1* | 6/2014 | Ellard | G06F 12/0808 |
| | | | | 711/135 |
| 2014/0223094 | A1* | 8/2014 | Baderdinni | G06F 3/0619 |
| | | | | 711/114 |
| 2014/0330817 | A1* | 11/2014 | Eleftheriou | G06F 16/245 |
| | | | | 707/722 |
| 2015/0052299 | A1* | 2/2015 | Mirichigni | G06F 13/00 |
| | | | | 711/114 |
| 2016/0077744 | A1* | 3/2016 | Pundir | G06F 3/0608 |
| | | | | 711/103 |
| 2017/0004082 | A1* | 1/2017 | Sehgal | G06F 11/1451 |
| 2018/0322052 | A1* | 11/2018 | Benedict | G06F 12/0866 |

FOREIGN PATENT DOCUMENTS

| | | |
|---|---|---|
| JP | 2009-520279 A | 5/2009 |
| JP | 2015-507781 A | 3/2015 |
| JP | 2016-103304 A | 6/2016 |
| WO | 2013/088284 A1 | 6/2013 |

OTHER PUBLICATIONS

Masakazu Kobayash, "Technology: Two types of dedicated file server machines used in large-scale networks have appeared", Nikkei Electronics, No. 525, Apr. 15, 1991, pp. 153-160.

* cited by examiner

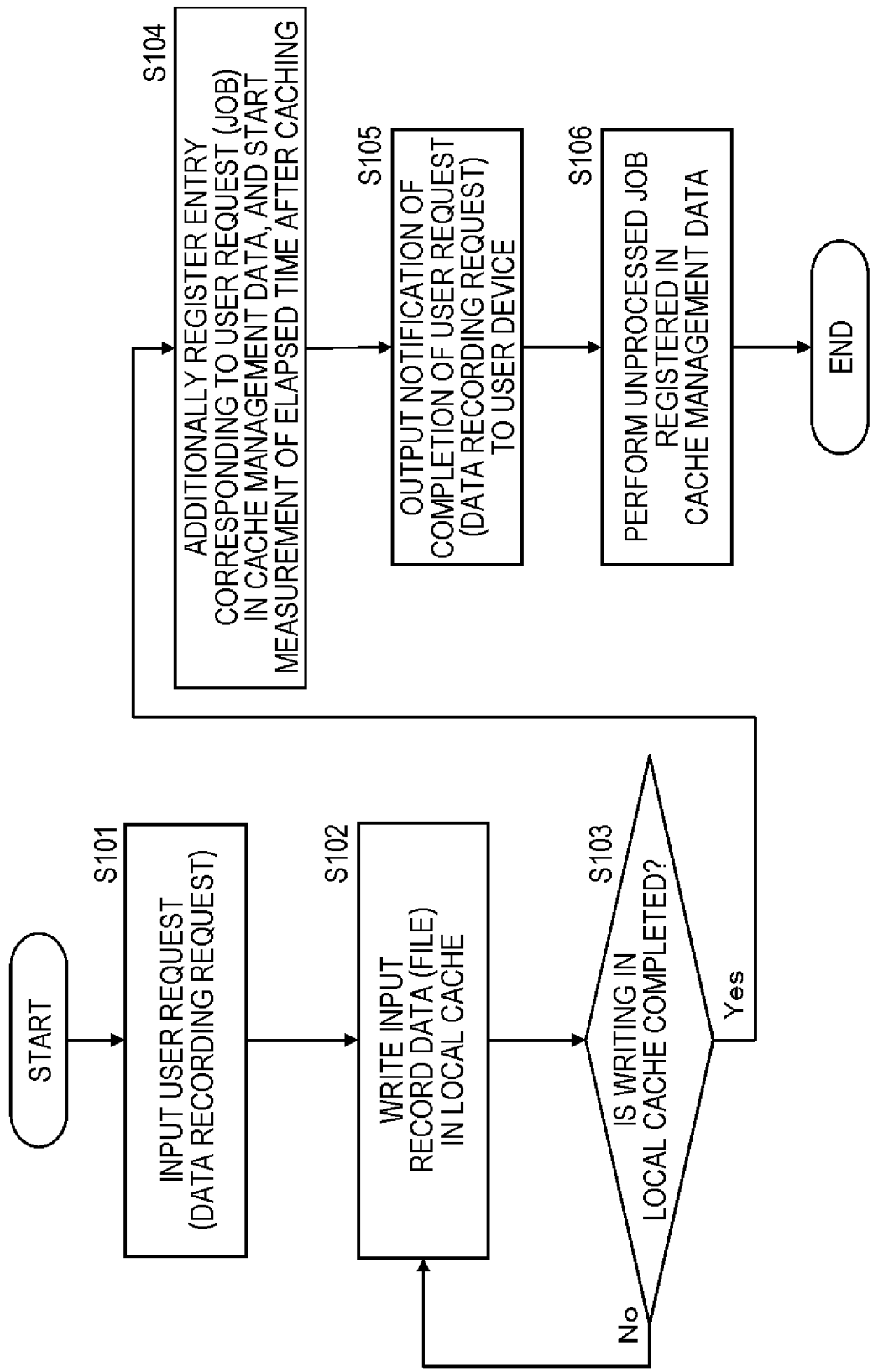

FIG. 6

| | (a)<br>JOB ID<br>(USER<br>REQUEST ID) | (b)<br>CACHE<br>FILE NAME | (c)<br>DATA VOLUME<br>(GB) | (d)<br>ELAPSED TIME<br>AFTER CACHING<br>(hms (HOUR, MINUTE,<br>AND SECOND)) | (e)<br>STATE OF<br>RECORDING<br>PROCESSING<br>IN LIBRARY | (f)<br>LIBRARY<br>RECORDING START<br>PERMISSION FLAG | (g)<br>FILE<br>ATTRIBUTE<br>IDENTIFIER |
|---|---|---|---|---|---|---|---|
| (1) | J001 | F00123 | 30 | 220h30m50s | RECORDED | — | N |
| (2) | J002 | F12345 | 10 | 190h52m12s | RECORDED | — | N |
| (3) | J003 | F34215 | 15.5 | 100h41m23s | RECORDED | — | N |
| .. | .. | .. | .. | .. | .. | .. | .. |
| (21) | J021 | F23445 | 18 | 25m40s | UNDER RECORDING | — | A |
| (22) | J022 | F65781 | 7 | 8m20s | UNRECORDED | 1 (START OF RECORDING IS PERMITTED) | A |
| (23) | J023 | F98123 | 2 | 5m10s | UNRECORDED | 1 (START OF RECORDING IS PERMITTED) | A |
| (24) | J024 | F55785 | 25 | 3m25s | UNRECORDED | 0 (START OF RECORDING IS NOT PERMITTED) | A |
| (25) | J025 | .. | .. | .. | .. | .. | .. |
| .. | .. | .. | .. | .. | .. | .. | .. |

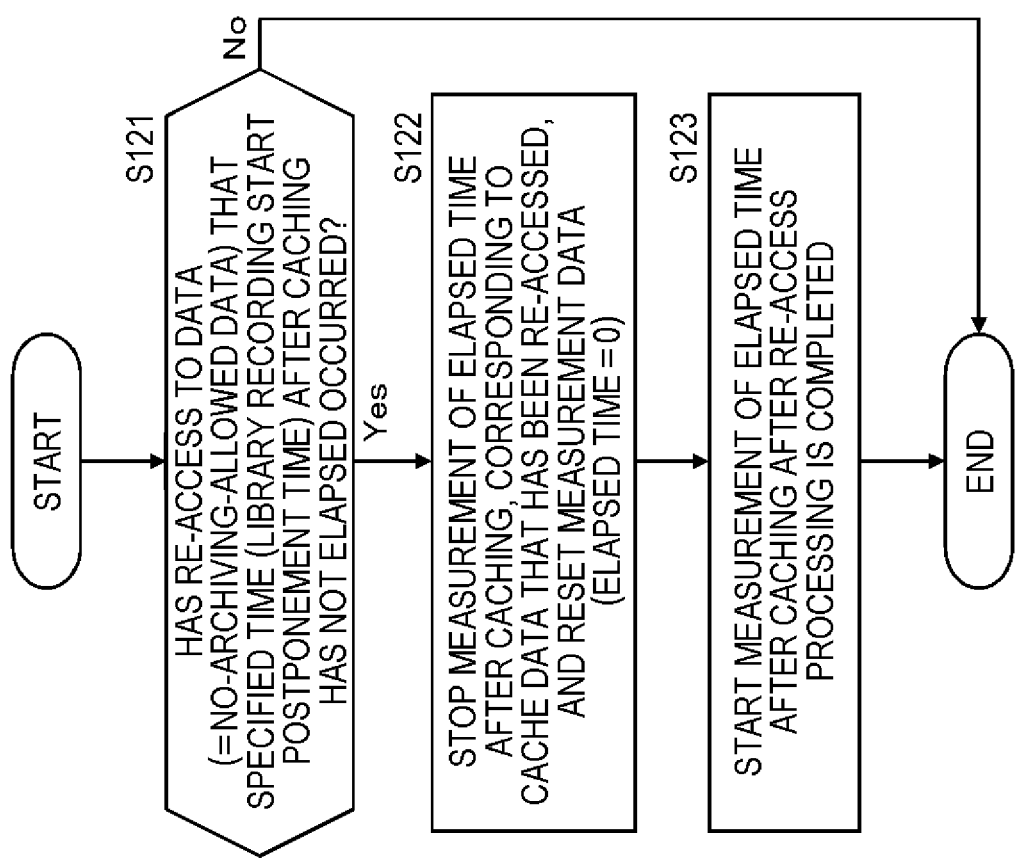

INFORMATION PROCESSING DEVICE AND INFORMATION PROCESSING METHOD

CROSS REFERENCE TO RELATED APPLICATIONS

This application is a U.S. National Phase of International Patent Application No. PCT/JP2019/039976 filed on Oct. 10, 2019, which claims priority benefit of Japanese Patent Application No. JP 2018-203767 filed in the Japan Patent Office on Oct. 30, 2018. Each of the above-referenced applications is hereby incorporated herein by reference in its entirety.

TECHNICAL FIELD

The present disclosure relates to an information processing device, an information processing method, and a program. Specifically, the present disclosure relates to an information processing device that performs data recording and reading using an archive device having a data recording/retention function, an information processing method, and a program.

BACKGROUND ART

An archive device is known as a data recording device that enables long-term data retention. The archive device is a device that includes, for example, a large number of optical discs as data recording media, records a large amount of data, for example, data such as a television program, on the optical discs, and retains the data for a long term. A large-scale storage device capable of retaining a large amount of data for a long term as described above is called an archive device.

Related arts that disclose the archive device include, for example, Patent Document 1 (Japanese Patent Application Laid-Open No. 2016-103304), Patent Document 2 (Japanese Patent Application Laid-Open (Translation of PCT Application) No. 2009-520279), and the like.

In a case of recording data on recording media such as optical discs in the archive device or reading data recorded on the optical discs, it is necessary to generate and input a command that can be understood by the archive device.

Specifically, for example, archive device-specific processing such as inputting a command specified in an archive device-specific application programming interface (API) is required.

Therefore, for example, even a device such as a personal computer (PC) or the like connected to the archive device via a network cannot access data in the archive device unless the device has the above-described archive device-specific API.

Although it is possible to install the archive device-specific API in a user device such as a PC or the like connected to the archive device via the network, there are many user devices connected via the network. In addition, a new user device is often connected, and such a user device cannot access the archive device, which is problematic.

Furthermore, it is also possible to covert an output command of the PC, which is the user device, into an archive device-specific API command to use the archive device, but one major problem is that data recording processing performed by the archive device takes a long time.

Many archive devices are configured to perform special data recording processing different from normal data recording processing performed on optical discs such as digital versatile discs (DVD) or the like, in order to reliably retain a large amount of data for a long term. Therefore, there is a problem that a data recording speed is low and the data recording processing takes time.

For example, it is assumed that that writing of data takes several tens of minutes to several hours to complete the data recording processing in a case where a data writing request is made from a user's PC to the archive device. In such a case, the user is kept waiting until the data recording processing is completed, which significantly impairs the efficiency of processing performed on the user side.

CITATION LIST

Patent Document

Patent Document 1: Japanese Patent Application Laid-Open No. 2016-103304
Patent Document 2: Japanese Patent Application Laid-Open (Translation of PCT Application) No. 2009-520279

SUMMARY OF THE INVENTION

Problems to be Solved by the Invention

The present disclosure has been made in view of, for example, the problems described above, and an object of the present disclosure is to provide an information processing device which enables a user device such as a general PC or the like that does not have an archive device-specific API to access an archive device via a network, record data in the archive device, and read data from the archive device, an information processing method, and a program.

Further, in one embodiment of the present disclosure, in a case where a data recording request is made from the user device to the archive device, a recording completion notification is immediately made for the user device, and recording processing is performed on media in the archive device after a predetermined time elapses from when the recording request is input. With this configuration, an information processing device that eliminates a waiting time of the user device and enables reliable and efficient data recording, an information processing method, and a program are provided.

Solutions to Problems

A first aspect of the present disclosure is
an information processing device including:
a data processing section that performs a data recording processing control on a library which is a data storage section of an archive device,
in which the data processing section,
in response to a data recording request from an external device to the library,
saves record data in a local cache section, measures an elapsed time after saving the record data in the local cache section, and
records the record data from the local cache section in the library in a case where the elapsed time exceeds a predetermined postponement time.
Moreover, a second aspect of the present disclosure is
an information processing method performed in an archive device and causing a data processing section that is included in the archive device and performs a data recording processing control on a library which is a data storage section to perform:

in response to a data recording request from an external device to the library, saving record data in a local cache section; measuring an elapsed time after saving the record data in the local cache section; and recording the record data from the local cache section in the library in a case where the elapsed time exceeds a predetermined postponement time.

Moreover, a third aspect of the present disclosure is a program causing an archive device to perform information processing and causing a data processing section that is included in the archive device and performs a data recording processing control on a library which is a data storage section to perform:

in response to an input of a data recording request from an external device to the library, processing of saving record data in a local cache section and measuring an elapsed time after saving the record data in the local cache section; and processing of recording the record data from the local cache section in the library in a case where the elapsed time exceeds a predetermined postponement time.

Note that the program of the present disclosure is, for example, a program that can be provided by a storage medium or a communication medium provided in a computer-readable format to an information processing device, an image processing device, or a computer system capable of executing various program codes. By providing such a program in a computer-readable format, processing according to the program can be implemented on an information processing device or a computer system.

Still other objects, features, and advantages of the present disclosure will become apparent by a more detailed description based on embodiments and accompanying drawings of the present invention as described later. Note that, in the present specification, the system is a logical assembly of a plurality of devices, and the devices having respective configurations are not necessarily accommodated in the same housing.

Effects of the Invention

According to the configuration of an embodiment of the present disclosure, the configuration, in which access processing such as data recording from an external device to the archive device can be efficiently performed, is implemented.

Specifically, for example, the data processing section that performs a data recording processing control on a library, which is the data storage section of the archive device is provided. The data processing section saves record data in the local cache section in response to an input of the data recording request from the external device to the library, and outputs a recording processing completion notification to the external device. Further, an elapsed time after the saving in the local cache section is measured, and after the saving in the local cache section, the record data is transferred from the local cache section to the library and recorded after a pre-specified postponement time elapses.

With this configuration, the configuration, in which access processing such as data recording from an external device to the archive device can be efficiently performed, is implemented.

Note that the effects described in the present specification are merely illustrative and not limitative, and the present disclosure may have additional effects.

BRIEF DESCRIPTION OF DRAWINGS

FIG. 5 is a flowchart for describing a sequence of data recording processing performed on a local cache section by the data processing section of the archive device.

FIG. 6 is a diagram for describing an example of cache management data.

FIG. 7 is a flowchart for describing a processing sequence of elapsed time management processing for cache data, performed by the data processing section of the archive device.

MODE FOR CARRYING OUT THE INVENTION

Hereinafter, details of an information processing device, an information processing system, an information processing method, and a program of the present disclosure will be described with reference to the drawings. Note that the description will be given according to the following items.

1. Configuration Example and Processing of Information Processing System of Present Disclosure
2. Configuration and Processing of Archive Device of Present Disclosure
3. Configuration and Processing of Data Processing Section of Archive Device
4. Sequence of Processing Performed by Data Processing Section of Archive Device
    4-1. (Processing 1) Sequence of Processing for Data Recording Request Made from User Device
    4-2. (Processing 2) Processing Sequence of Elapsed Time Management Processing before Starting Recording, in Library 102, Cache Data Saved in Local Cache Section
    4-3. (Processing 3) Processing Sequence of Processing of Recording, in Library 102, Cache Data Saved in Local Cache Section, and Elapsed Time Management Processing after Starting Recording
    4-4. (Processing 4) Processing Sequence of Data Erase Processing Performed on Local Cache Section 5. Hardware Configuration Example of Archive Device
6. Application Example
7. Summary of Configuration of Present Disclosure

1. Configuration Example and Processing of Information Processing System of Present Disclosure First, a configuration example and processing of an information processing system of the present disclosure will be described with reference to FIG. 1.

Figure 1:
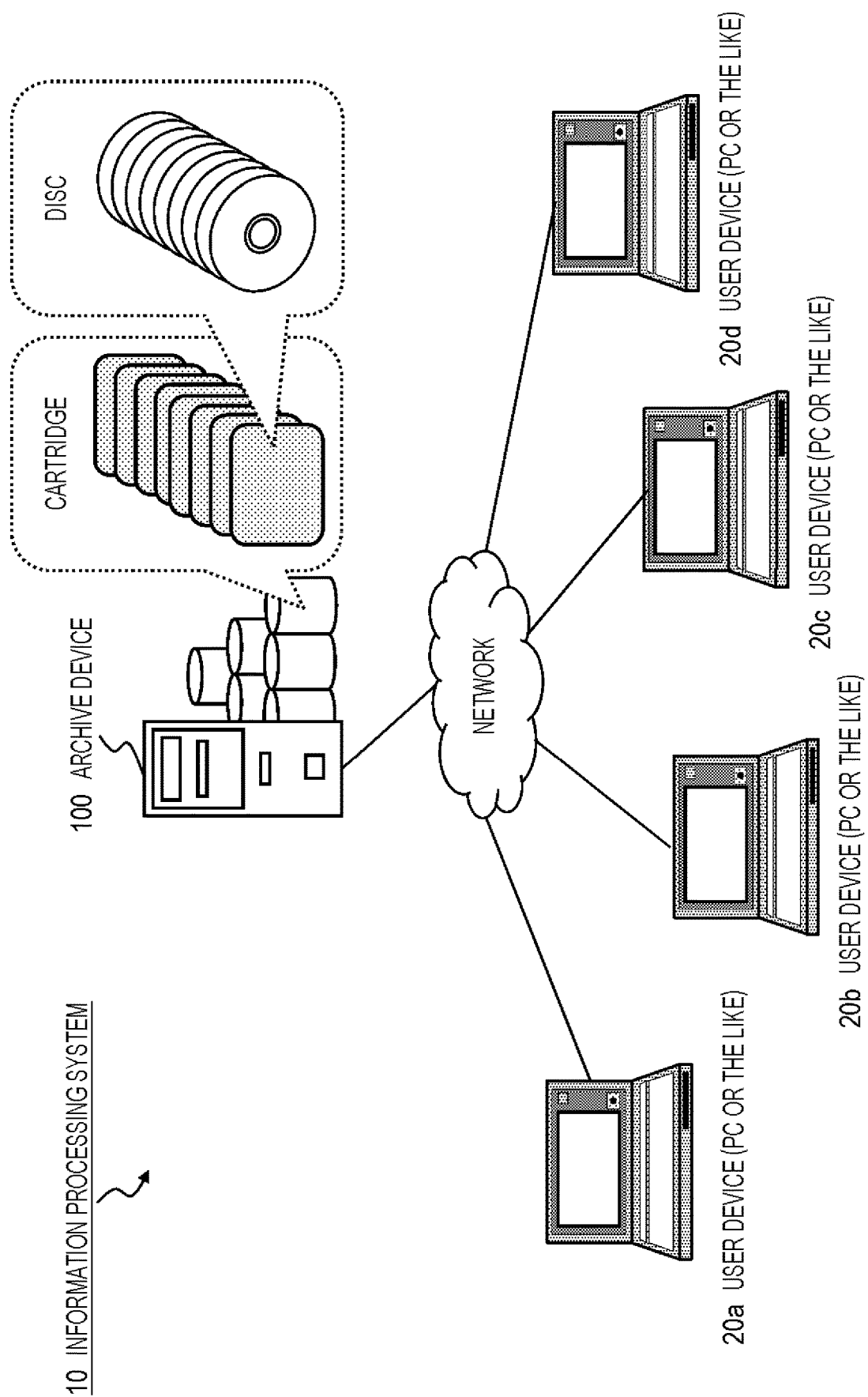
FIG. 1 is a diagram for describing a configuration example and processing of an archive device, which is an information processing device of the present disclosure, and an information processing system including the archive device.

FIG. 1 is a diagram illustrating a configuration example of an information processing system 10 of the present disclosure.

The information processing system 10 includes an archive device 100 and a plurality of user devices 20 connected to a network. The user device 20 is, for example, a device such as a personal computer (PC).

The archive device 100 includes, for example, a large number of optical discs as recording media. As illustrated in FIG. 1, the archive device 100 houses a large number of cartridges in which a plurality of optical discs is housed.

The archive device 100 is a large-capacity storage device in which, for example, long video data or the like can be recorded on an optical disc and long-term retention of the record data is possible.

In order to perform processing of recording data on the optical discs as the recording media in the archive device 100 or processing of reading data recorded on the optical discs, it is necessary to generate and input a command that can be understood by the archive device 100.

Specifically, for example, archive device-specific processing such as inputting a command (HTTP command or the like) specified in an archive device-specific application programming interface (API) is required.

On the other hand, the user device 20 illustrated in FIG. 1 is a device such as a PC or the like, and many devices cannot use the archive device-specific API.

An existing file system, for example, a file system such as a new technology file system (NTFS), server message block (SMB), network file system (NFS), or the like, is installed in the user device 20.

Therefore, the user device 20 uses the file system such as the NTFS, the SMB, the NFS, or the like to access the media in the user device 20, or various media such as an externally connected hard disc or optical disc, a flash memory, and the like.

The discs in the archive device 100 illustrated in FIG. 1 are also externally connected media when viewed from the user device 20. However, as described above, in order to perform data recording processing or data read processing on the recording media in the archive device 100, it is necessary to input a command specified in the API specific to the archive device 100, and a user device 20 that cannot output this command cannot access (perform data recording or data reading) the media of the archive device 100.

The system of the present disclosure solves this problem and uses an existing file system installed in the user device 20, such as a file system such as the NTFS, the SMB, the NFS, or the like, to enable access (data recording or data reading) to the media of the archive device 100.

Hereinafter, a configuration and processing of the archive device 100 for implementing this processing will be described.

2. Configuration and Processing of Archive Device of Present Disclosure

Next, the configuration and processing of the archive device 100 of the present disclosure will be described with reference to FIG. 2 and subsequent drawings.

Figure 2:
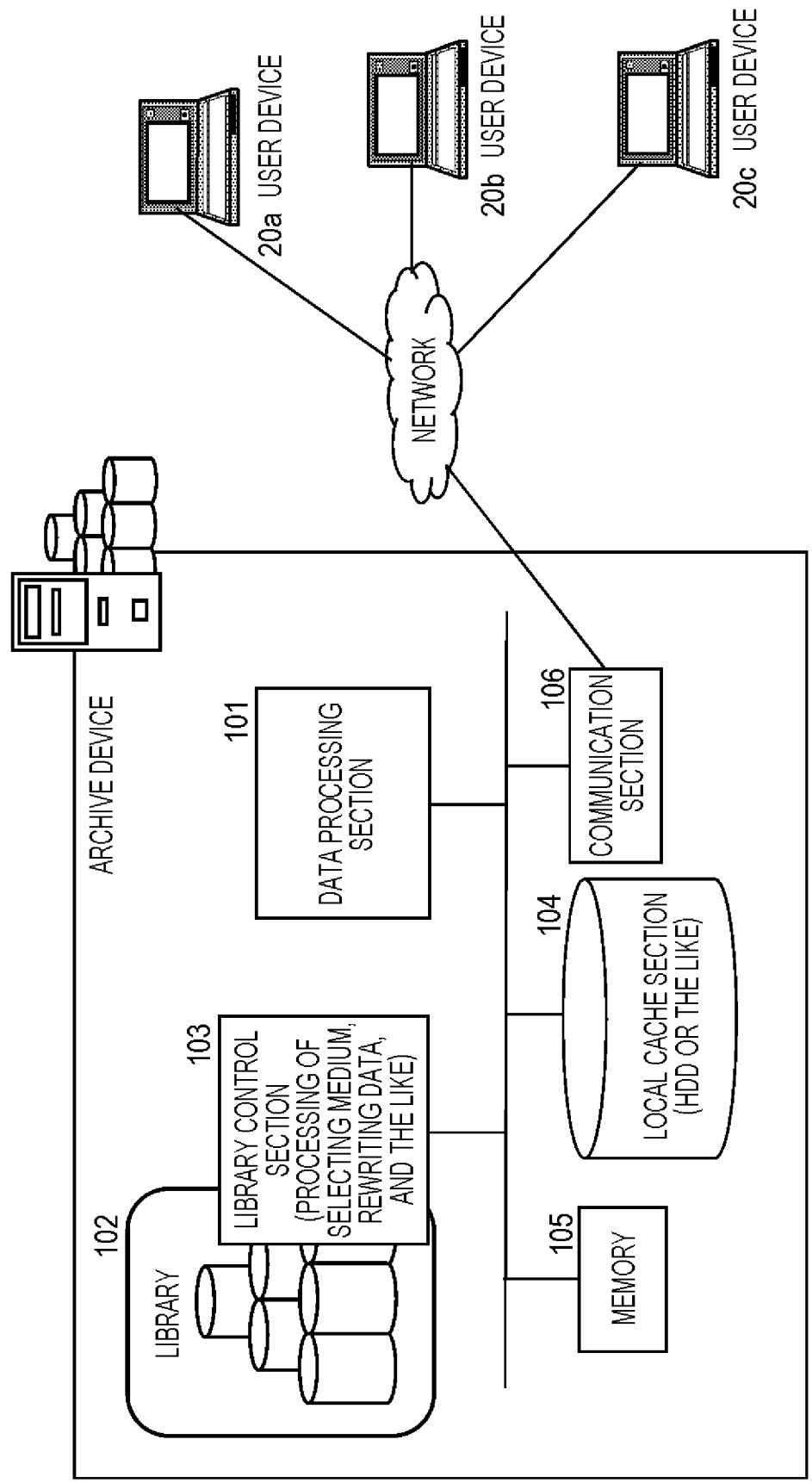
FIG. 2 is a diagram illustrating a configuration and processing of the archive device.

FIG. 2 is a diagram illustrating a configuration example of the archive device 100 of the present disclosure.

As illustrated in FIG. 2, the archive device 100 includes a data processing section 101, a library 102, a library control section 103, a local cache section 104, a memory 105, and a communication section 106.

The data processing section 101 performs an overall control of various data processing performed on the archive device 100, such as processing of recording data in the archive device 100, processing of reading data from the archive device 100, data update processing for data recorded in the archive device 100, and the like.

The library 102 is a data retention area of the archive device 100, and includes a large number of data recording media, for example, a large number of optical discs. Note that, as described with reference to FIG. 1, the library 102 is a component including a large number of cartridges housing a plurality of optical discs.

The library control section 103 selects a disc to be subjected to data recording or data reading from a large number of discs housed in the library 102, and performs data recording processing or data read processing.

Note that the media mounted on the library 102 are, for example, (write-once) optical discs on which data can be recorded only once. The reason for using such type of media is to ensure long-term retention or integrity of record data.

However, it is also possible to use other overwritable media.

The local cache section 104 is a high-speed accessible recording medium such as a hard disk, a flash memory, or the like, and is a data-recordable, erasable, and rewritable medium.

In the configuration of the present disclosure, record data input from the user device 20 in response to a data recording request made from the user device 20 to the archive device 100, or data read from the library 102 in response to a data reading request made from the user device 20 to the archive device 100 is temporarily saved in the local cache section 104. A control of the processing is mainly performed by the data processing section 101.

Further, even in a case where the user device 20 performs a data update such as overwriting data read from the library 102 or the like, the data update is performed as update processing of data saved in the local cache section 104, and the updated data is transferred from the local cache section 104 to the media in the library 102 and recorded. A control of the processing is also mainly performed by the data processing section 101.

In the memory 105 illustrated in FIG. 2, management data, processing programs, parameters, and the like related to the processing performed by the archive device 100 are recorded.

The communication section 106 is used for communication with an external device such as an external user device 20 or the like.

A specific example of the control processing performed by the data processing section 101 will be described in detail later, and an outline of the processing performed by the data processing section 101 will be described.

For example, in a case where the data recording request or the data update request is made from the user device 20 to the archive device 100, record data or updated data input from the user device is first saved in the local cache section 104.

The processing of recording data in the local cache section 104 or the processing of updating data saved in the local cache section 104 can be completed in a short time. Once the data recording processing or the data update processing performed on the local cache section 104 is completed, the data processing section 101 of the archive device 100 notifies the user device 20 via the communication section 106 that the processing is completed.

Upon receiving this completion notification, the user device 20 can determine that the data recording (or update) has been completed, and can proceed to the next processing without delay.

Thereafter, the data saved in the local cache section 104 is recorded on the disc in the library 102 via the library control section 103 on the basis of the determination made by the data processing section 101.

Note that the data recording processing performed on the disc in the library 102 is time-consuming processing.

As described above, the archive device 100 of the present disclosure does not perform the time-consuming data recording processing on the disc in the library 102 in response to the data recording request made from the user device, but performs processing of saving record data in the local cache section 104 and outputs a recording completion notification to the user, in response to the data recording request made from the user device. Then, after a predetermined time elapses, data saved in the local cache section 104 is transferred to the disc in the library 102 and recorded.

In this way, the processing of recording data on the disc in the library 102 is performed as asynchronous processing that is separate from a recording request made from the user device.

By this processing, the user device 20 can proceed to the next processing without waiting for the completion of data recording performed on the library 102 of the archive device 100.

In the configuration of the present disclosure, storage means of the archive device 100 to be accessed by the user device 20 is the local cache section 104. The processing of accessing the local cache section 104 can be performed by using an existing file system available to the user device 20, for example, a file system such as the NTFS, the SMB, the NFS, or the like.

On the other hand, in a case of recording, in the library 102, data (cache data) saved in the local cache section 104, the data processing section 101 of the archive device 100 performs processing using an archive device-specific API-compatible command.

By this processing, the media (discs) in the library 102 can be accessed, and data can be recorded on and read from the media (discs) in the library 102.

As described above, in the configuration of the present disclosure, access to the archive device 100 from the user device 20 can be performed as access to the local cache section 104, instead of access to the media (discs) in the library 102. As a result, access processing using an existing file system used by the user device 20, for example, a file system such as the NTFS, the SMB, the NFS, or the like, can be performed.

On the other hand, the access to the media (discs) in the library 102 is performed as internal processing of the archive device 100.

Specifically, the data processing section 101 of the archive device 100 controls data transfer between the library 102 and the local cache section 104. The data transfer requires processing using the archive device-specific API-compatible command.

By interposing the local cache section 104 between the user device 20 and the library 102 of the archive device 100 in this way, the user device 20 does not need to directly access the library 102 of the archive device 100. With this configuration, the user device 20 can record or read data in or from the archive device 100 without using the archive device-specific API-compatible command.

Note that what kind of data exists in the library 102 of the archive device 100 can be confirmed on the basis of directory information provided from the archive device 100 to the user device 20. The data processing section 101 of the archive device 100 generates directory information indicating a record data structure in the library 102 and provides the directory information to the user device.

Figure 3:
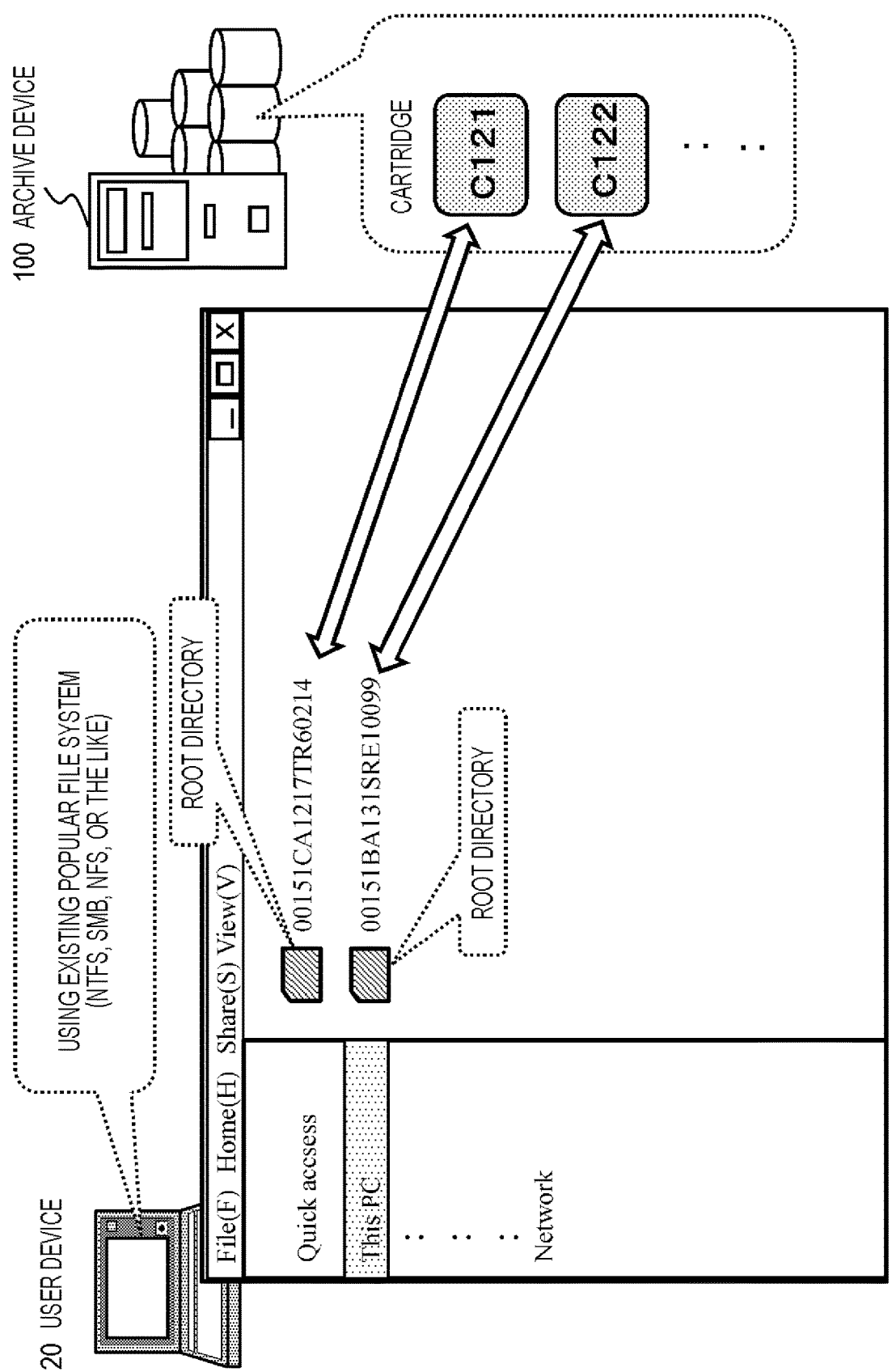
FIG. 3 is a diagram for describing an example in which a user device accesses media of the archive device.

FIG. 3 is an example in which the directory information is displayed on the user device 20 connected to the archive device 100.

For example, as illustrated in FIG. 3, one root directory is displayed in association with one cartridge in the library 102 of the archive device 100.

One or more data files are contained inside one root directory illustrated in FIG. 3.

These data files correspond to individual files recorded on discs in a cartridge corresponding to the root directory thereof.

Note that, according to a control of the data processing section of the archive device 100, it is possible to set a cartridge to be displayed on the user device 20 (online cartridge) and a cartridge not to be displayed (offline cartridge).

3. Configuration and Processing of Data Processing Section of Archive Device Next, a configuration and processing of the data processing section 101 of the archive device 100 will be described with reference to FIG. 4 and subsequent drawings.

Figure 4:
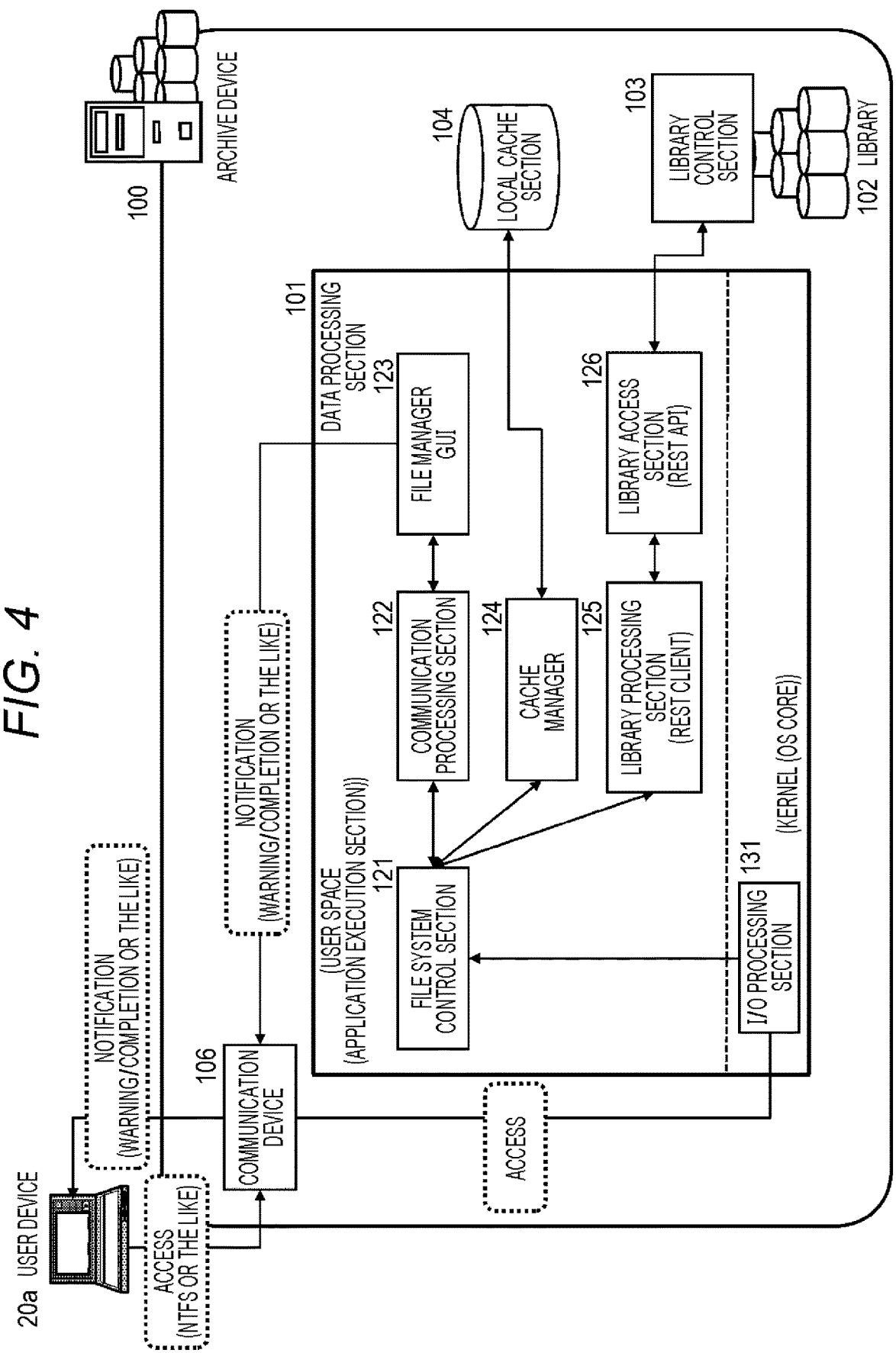
FIG. 4 is a diagram for describing a configuration and processing of a data processing section of the archive device.

FIG. 4 is a diagram illustrating, as individual functional blocks, processing performed by the data processing section 101 of the archive device 100. Each block corresponds to, for example, an individual processing function constituting a program (software) executed by the data processing section 101.

Note that, as illustrated in FIG. 4, the program executed by the data processing section 101 is divided into a kernel corresponding to an operating system (OS) core section and a user space (application execution section) in which various applications are executed. Various applications can be executed in the user space on the OS (kernel).

The blocks illustrated in the user space of FIG. 4 are functional blocks of one application that performs data recording processing, data read processing, and the like, on the archive device 100.

As illustrated in FIG. 4, the application executed in the user space (application execution section) of the data processing section 101 includes the following processing sections (functions):

a file system control section 121, a notification processing section 122, a file manager GUI 123, a cache manager 124, a library processing section (REST client) 125, and a library access section (REST API) 126.

The file system control section 121 performs the processing of the present disclosure, that is, overall control processing related to access to data of the archive device 100, such as processing of accessing the local cache section 104 from the user device 20, processing of transferring data between the local cache section 104 and the library 102, processing of making a notification to the user device, or the like.

Note that an access request made from the user device 20 to the archive device 100 is input to the data processing section 101 via the communication section 106, and is passed to an application that is under execution in the user space (application execution section) via the I/O processing section 131 in the kernel section of the data processing section 101. In the example illustrated in FIG. 4, the file system control section 121 of the application that is under execution in the user space (application execution section) receives the access request and performs processing therefor.

The notification processing section 122 and the file manager GUI 123 performs processing of making a notification to the user device 20, for example, processing of making a notification of an error message when an abnormality occurs, or processing completion notification processing such as data recording completion or the like.

These notifications are output to the user device 20 via the communication section 106.

Note that display data of the directory described with reference to FIG. 3 is also display data generated by the processing performed by the file manager GUI 123. The file system control section 121 acquires structure information of the library 102 via the library processing section 125 and the library access section 126, and the file manager GUI 123 generates display data indicating the directory structure as illustrated in FIG. 3 on the basis of the structure information, and provides the display data to the user device 20.

In a case of applying the file manager GUI 123 to generate the display data indicating the directory structure as illustrated in FIG. 3, as described above, the file system control section 121 can perform a control such as setting the cartridge (online cartridge) to be displayed on the user device 20 and the cartridge (offline cartridge) not to be displayed.

The cache manager 124 controls processing using the local cache section 104, specifically, data recording processing or data read processing performed on the local cache section 104.

Data read from the library 102 of the archive device 100, data input from the user device 20, and the like are recorded in the local cache section 104.

The library processing section (REST client) 125 and the library access section (REST API) 126 access the library 102 via the library control section 103 of the archive device 100.

The library processing section (REST client) 125 performs processing of calling an API used to access the library 102 or the like, and the library access section (REST API) 126 access the library 102 to which the called API is applied.

Note that the library control section 103 selects a cartridge in the library 102 and a disc in the cartridge in response to an access command input from the library access section (REST API) 126, and loads the selected disc in a data recording/playback section in the library control section 103 to perform actual data recording or data reading.

Note that data recorded in the library 102 is data acquired from the local cache section 104, and data read from the library 102 is saved in the local cache section 104.

4. Sequence of Processing Performed by Data Processing Section of Archive Device Next, a plurality of processing performed by the data processing section 101 of the archive device 100 of the present disclosure will be described with reference to a flowchart of FIG. 5 and subsequent drawings.

The sequence of the following respective processing will be described with reference to FIG. 5 and subsequent drawings.

(Processing 1) A sequence of processing for a data recording request made from the user device 20 (FIG. 5)

(Processing 2) A processing sequence of elapsed time management processing before starting recording, in the library 102, cache data saved in the local cache section 104 (FIG. 7)

Figure 8:
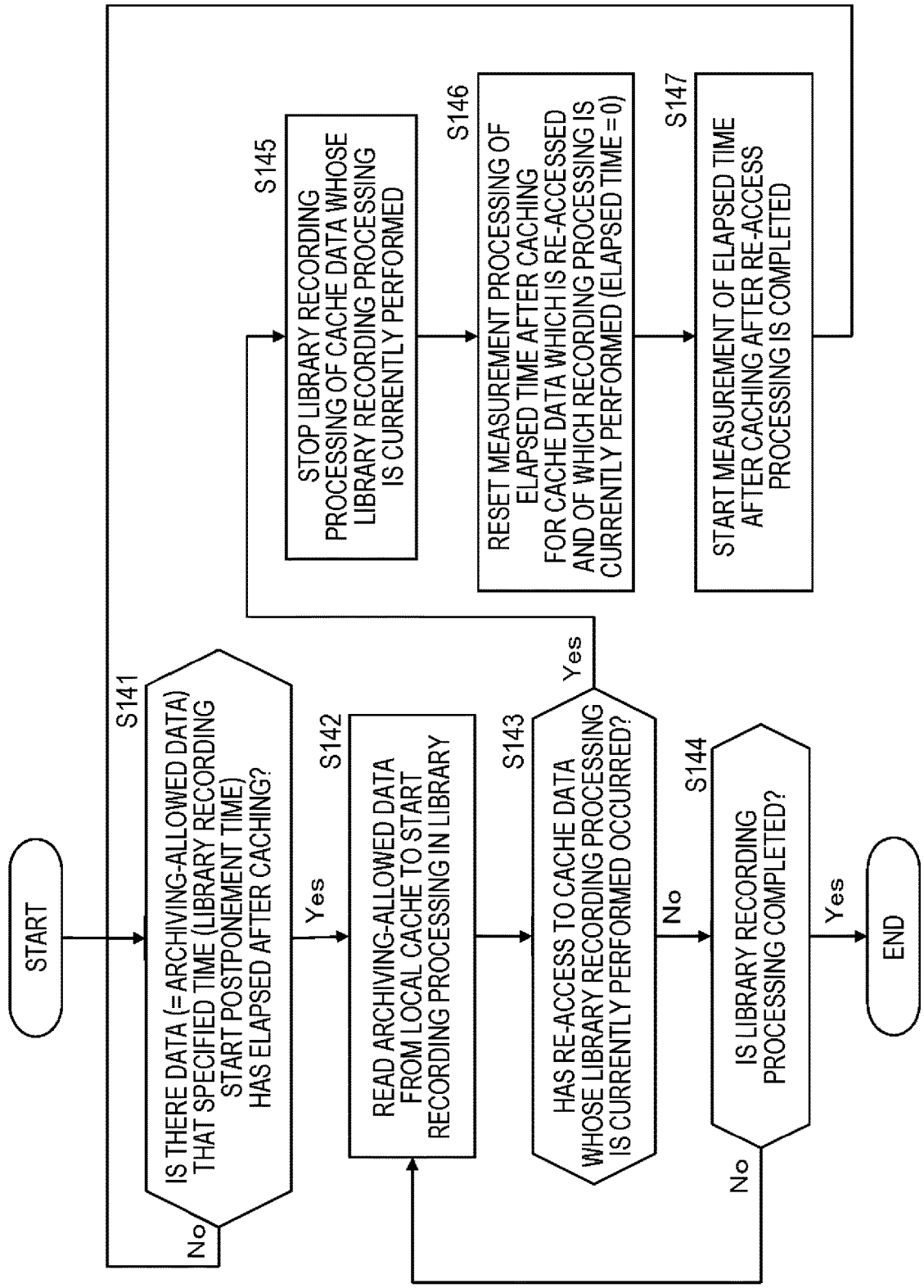
FIG. 8 is a flowchart for describing a sequence of processing of recording cache data in a library, performed by the data processing section of the archive device.

(Processing 3) A processing sequence of processing of recording, in the library 102, cache data saved in the local cache section 104, and elapsed time management processing after starting recording (FIG. 8)

Figure 9:
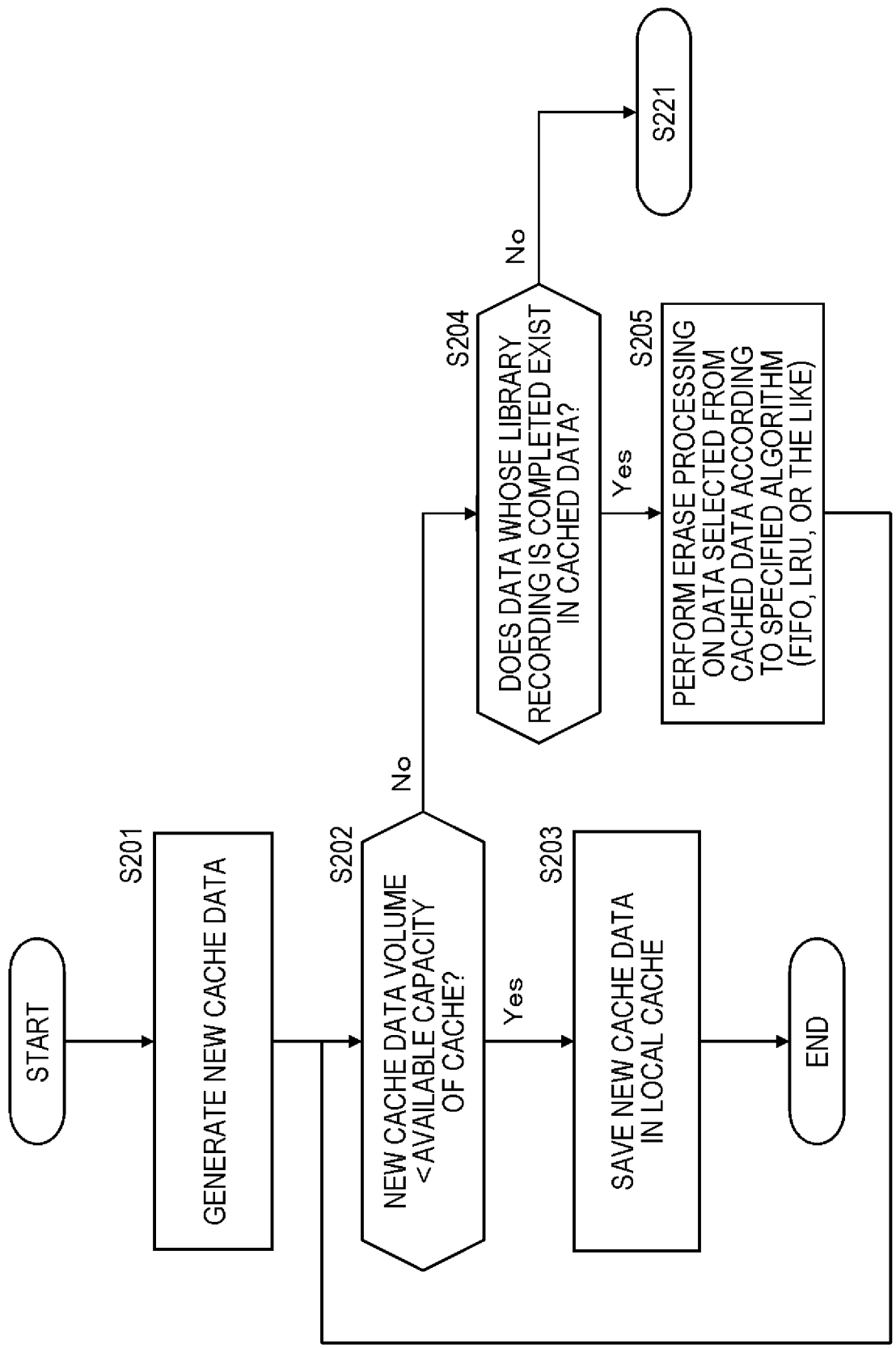
FIG. 9 is a flowchart for describing a processing sequence of data erase processing performed on the local cache section by the data processing section of the archive device.
Figure 10:
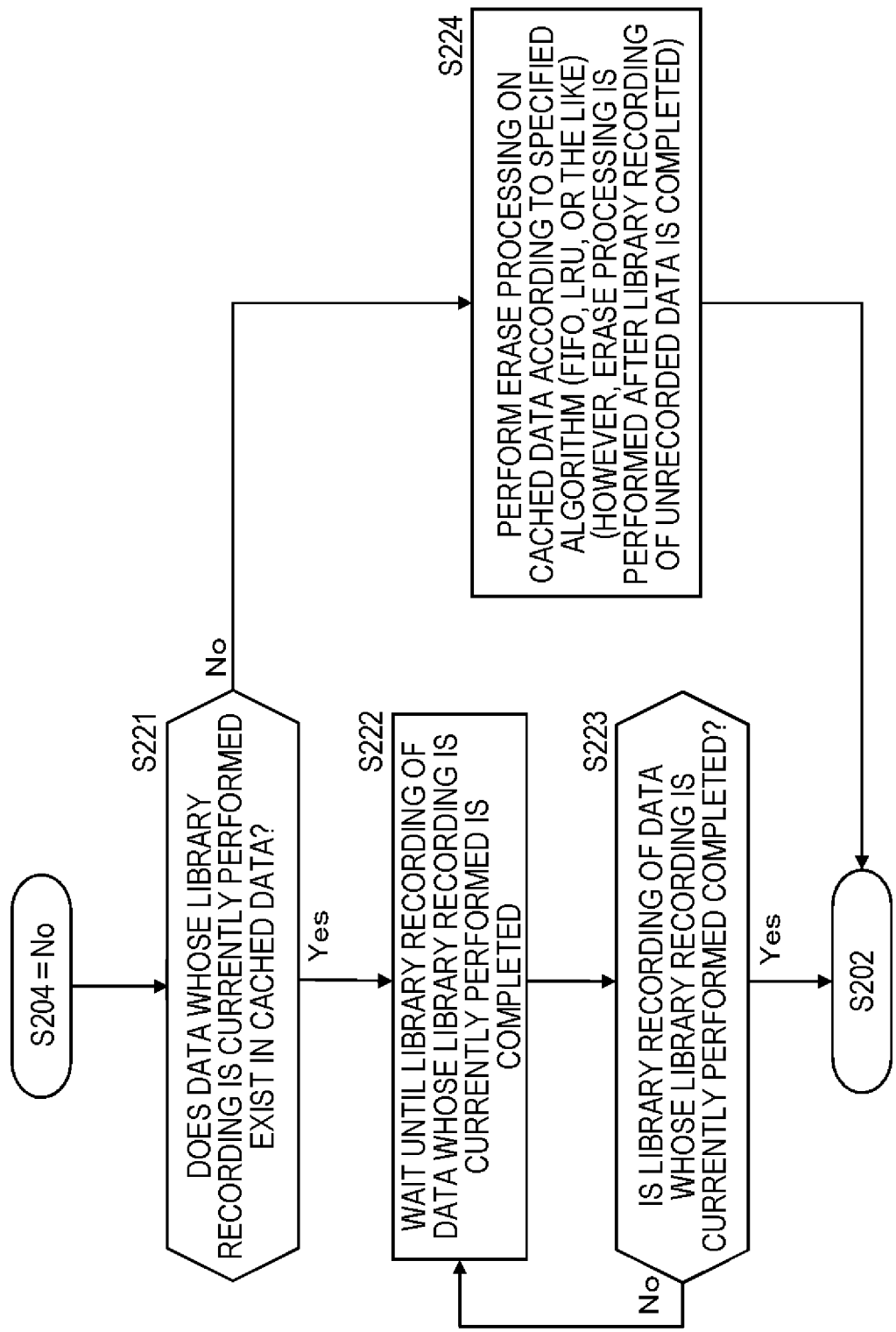
FIG. 10 is a flowchart for describing a processing sequence of data erase processing performed on the local cache section by the data processing section of the archive device.

(Processing 4) A processing sequence of data erase processing performed on the local cache section 104 (FIGS. 9 and 10)

[4-1. (Processing 1) Sequence of Processing for Data Recording Request Made from User Device 20]

First, a sequence of processing for a data recording request made from the user device 20 will be described with reference to the flowchart illustrated in FIG. 5.

Note that the processing according to the flowchart illustrated in FIG. 5 and subsequent drawings can be performed according to the program saved in the storage section of the archive device 100, for example, the memory 105 in the data processing section 101 illustrated in FIG. 2, and can be performed under the control of, for example, the data processing section 101 including a processor such as a central processing unit (CPU) having a program execution function, or the like.

Hereinafter, processing of each step of the flowchart illustrated in FIG. 5 will be described.

(Step S101)

First, the data processing section 101 of the archive device 100 inputs a user request made from the user device 20, specifically, a data recording request made to the archive device 100.

As described above with reference to FIG. 4, the access request made from the user device 20 to the archive device 100 is input to the data processing section 101 via the communication section 106, and is passed to the application that is under execution in the user space (application execution section) via the I/O processing section 131 in the kernel section of the data processing section 101. In the example illustrated in FIG. 4, the file system control section 121 of the application that is under execution in the user space (application execution section) receives the access request and starts processing therefor.

(Step S102)

Next, in step S102, the data processing section 101 saves, in the local cache section 104, record data (file) input from the user device 20 in accordance with the request (data recording request) input in step S101.

This processing is processing performed by the file system control section 121 and the cache manager 124 illustrated in FIG. 4. As described above, the cache manager 124 controls processing using the local cache section 104, specifically, data recording processing or data read processing performed on the local cache section 104.

In step S102, data input from the user device 20 is recorded in the local cache section 104.

As described above, the local cache section 104 is a high-speed accessible recording medium such as a hard disk, a flash memory, or the like, and is a data-recordable, erasable, and rewritable medium.

In the configuration of the present disclosure, data requested to be recorded, input from the user device 20 to the archive device 100 is temporarily saved in the local cache section 104.

(Step S103)

Next, in step S103, the data processing section 101 determines whether or not the processing of recording, in the local cache section 104, the data requested to be recorded from the user is completed.

In a case where the processing is not completed, the flow returns to step S102 and the data recording processing performed on the local cache section 104 is continued.

In a case where the processing is completed, the flow proceeds to step S104.

(Step S104)

Once the data recording processing performed on the local cache section 104 is completed, in step S104, the data processing section 101 additionally registers, in "cache management data", which is management information of cache data recorded in the local cache section 104, an entry corresponding to the user request (job). Moreover, measurement of an elapsed time after caching of cache data corresponding to the entry starts.

A specific example of the "cache management data" will be described with reference to FIG. 6.

The data processing section 101 of the archive device 100 registers each of data (cache data) saved in the local cache section 104 as, for example, an entry of the "cache management data" illustrated in FIG. 6, and saves it in the memory 105.

Note that each entry is generated corresponding to each cache data (file) for each user request (job). However, in a case where the same file as data (file) registered as an entry of "cache management data" is accessed, the data processing section 101 performs update processing on the entry corresponding to the data (file).

As illustrated in FIG. 6, in the "cache management data", the following items are recorded in association with each other for each user request (job), that is, for each entry corresponding to each cache data (file).

(a) Job ID (=user request ID)
(b) Cache file name
(c) Data volume (GB)
(d) Elapsed time after caching
(e) State of recording processing in library
(f) Library recording start permission flag
(g) File attribute identifier (a) In Job ID (=user request ID), an identifier (ID) of a job (user request) that has caused caching processing of data saved in the local cache section 104 to be performed is recorded.

(b) In Cache file name, a file name of a data file saved in the local cache section 104 is recorded.

(c) In Data volume (GB), a data volume of the data file saved in the local cache section 104 is recorded.

(d) In Elapsed time after caching, an elapsed time after caching of the data saved in the local cache section 104 is recorded. Note that the elapsed time is reset when re-access to cached data occurs. A specific example of this processing will be described later.

Note that access to the cached data includes write processing and read processing for the cached data. The write processing includes processing of creating, modifying, and updating data or files, as well as processing of changing, updating, moving, and renaming attributes of data or files, and the like.

(e) In State of recording processing in library, a state of processing of recording, in the library 102, data saved in the local cache section 104 is recorded. As illustrated in FIG. 6, one of state information, "recorded", "under recording", and "unrecorded", is recorded.

(f) In Library recording start permission flag, a flag indicating whether or not data saved in the local cache section 104 is data that may start to be recorded in the library 102 is recorded.

The data (file) saved in the local cache section 104 starts to be recorded in the library 102, that is, starts to be transferred from the local cache section 104 to the library 102 and recorded after a predetermined time (recording start postponement time) elapses.

Specifically, in a case where "(d) Elapsed time after caching" of data saved in the local cache section 104 exceeds the recording start postponement time, a recording start permission flag (for example, 1) is set.

On the other hand, in a case where "(d) Elapsed time after caching" does not exceed the recording start postponement time, a recording start non-permission flag (for example, 0) is set.

Note that the recording start postponement time can be set to vary, for example, 10 minutes, 20 minutes, 1 hour, or the like. Furthermore, it is also possible to set a different time depending on the type of data (file) and data (file) volume. Further, the recording start postponement time can be set and changed by an operator (user) of the archive device 100.

For example, the setting and change can be made in various categories such as data, files, discs in the library 102, cartridges, data types, and the like.

(g) In File attribute identifier, an identifier indicating whether or not data saved in the local cache section 104 is data whose recording processing in the library 102 is completed is recorded.

In a case where the data saved in the local cache section 104 is data whose recording processing in the library 102 has not been completed (not recorded or under recording), "attribute identifier=A" is recorded. In a case where the data saved in the local cache section 104 is data whose recording processing in the library 102 has been completed, "attribute identifier=A" is not assigned.

In a case where the data saved in the local cache section 104 is data whose recording processing in the library 102 has been completed, "attribute identifier=N" is recorded.

In this way, various information for each data (file) saved in the local cache section 104 is recorded in the cache management data.

In step S104, the data processing section 101 records the respective information (a) to (g) illustrated in FIG. 6 for the data recorded in the local cache section 104 in steps S102 to S103. Moreover, measurement of an elapsed time after caching starts for the cache data.

(Step S105)

Next, in step S105, the data processing section 101 of the archive device 100 outputs, to the user device 20 that has made the user request (data recording request), a notification of processing completion of the user request, that is, a processing completion notification indicating that processing for the data recording request made from the user is completed.

This processing is performed by the notification processing section 122 and the file manager GUI 123 of the data processing section 101 illustrated in FIG. 4. This notification is output to the user device 20 via the communication section 106.

Note that, as described above, the local cache section 104 is a storage device capable of high-speed access, such as a hard disk, a flash memory, or the like, and the processing of recording data in the local cache section 104 based on the user request is completed in a short time.

Therefore, the completion notification in step S105 can be made without causing a great delay from the input of the user request in step S101.

(Step S106)

Next, the data processing section 101 of the archive device 100 processes the cache management data saved in the memory 105, that is, an unprocessed job among the jobs registered in the cache management data described with reference to FIG. 6.

Note that, in this processing example, the job is processing of recording data recorded in the local cache section 104 on the media of the library 102.

Note that this processing is performed according to a value of "(f) Library recording start permission flag" in the cache management data described above with reference to FIG. 6.

That is, in a case where the value of "(f) Library recording start permission flag" is set to the recording start permission flag (for example, 1), the processing of performing recording on the media of the library 102 is performed.

A specific sequence of this processing will be described later with reference to the flowchart illustrated in FIG. 8.

[4-2. (Processing 2) Processing Sequence of Elapsed Time Management Processing before Starting Recording, in Library 102, Cache Data Saved in Local Cache Section 104]

Next, a processing sequence of elapsed time management processing before starting recording, in the library 102, cache data saved in the local cache section 104 will be described with reference to the flowchart illustrated in FIG. 7.

Hereinafter, processing of each step of the flowchart illustrated in FIG. 7 will be described.

(Step S121)

First, the data processing section 101 of the archive device 100 determines whether or not re-access to data whose elapsed time after caching does not exceed a pre-specified "recording start postponement time" among data saved in the local cache section 104 has occurred.

In a case where the occurrence of the re-access is not detected, no particular action is taken.

In a case where the occurrence of the re-access is detected, the flow proceeds to step S122.

(Step S122)

In a case where the occurrence of the re-access to the data whose elapsed time after caching does not exceed the pre-specified "recording start postponement time" is detected in step S121, in step S122, the data processing section 101 stops measurement of the elapsed time after caching for cache data as a re-access target, and resets measurement data, such that the elapsed time becomes 0 (elapsed time=0).

(Step S123)

Moreover, in step S123, the data processing section 101 starts measurement of the elapsed time after caching after the re-access processing for the cache data as the re-access target is completed.

In this way, in a case where the re-access to the data whose elapsed time after caching does not exceed the pre-specified "recording start postponement time" among the data saved in the local cache section 104 has occurred, the data processing section 101 of the archive device 100 stops the measurement of the elapsed time, and restarts the measurement of the elapsed time from 0 after the access is completed.

That is, frequently accessed data is not subjected to the processing of recording the data from the local cache section 104 in the library 102, and a data retention period thereof in the local cache section 104 is extended.

By performing such processing, it is possible to reduce the occurrence of unnecessary data recording in the library 102.

For example, in a case where the user device 20 repeats data update processing such as reading data in the local cache section 104 and overwriting a part of the data, when respective update data are sequentially recorded in the library 102, unnecessary recording data increases in the write-once recording media in the library 102.

In the configuration of the present disclosure, data recorded in the local cache section 104 is transferred to the library 102 and recorded after the pre-specified postponement time elapses.

Moreover, in a case where re-access occurs within the postponement time, the measurement of the elapsed time is stopped, and resetting is performed. By performing such processing, it is possible to reduce the possibility that a recordable capacity of the recording media of the library 102 is wasted.

Furthermore, the frequency of data transfer from the local cache section 104 to the library 102 and recording processing in the archive device 100 can be reduced, such that power consumption can be reduced.

[4-3. (Processing 3) Processing Sequence of Processing of Recording, in Library 102, Cache Data Saved in Local Cache Section 104, and Elapsed Time Management Processing after Starting Recording]

Next, a processing sequence of processing of recording, in the library 102, cache data saved in the local cache section 104, and elapsed time management processing after starting the recording will be described with reference to the flowchart illustrated in FIG. 8.

Hereinafter, processing of each step of the flowchart illustrated in FIG. 8 will be described.

(Step S141)

First, in step S141, the data processing section 101 of the archive device 100 determines whether or not there is data (=archiving-allowed data) whose elapsed time after caching is equal to or exceeds the pre-specified "recording start postponement time" among data saved in the local cache section 104.

Note that the data whose elapsed time after caching is equal to or exceeds the "recording start postponement time" is referred to as "archiving-allowed data".

The "archiving-allowed data" is data (cache data) that is allowed to start to be transferred from the local cache section 104 to the media of the library 102 and recorded.

On the other hand, data whose elapsed time after caching does not exceed the "recording start postponement time" is data that is not allowed to start to be transferred from the local cache section 104 to the media of the library 102 and recorded, and is referred to as "no-archiving-allowed data".

In step S141, in a case where the data whose elapsed time after caching is equal to or exceeds the "recording start postponement time" (=archiving-allowed data) is detected, the flow proceeds to step S142.

(Step S142)

In a case where the archiving-allowed data whose elapsed time after caching is equal to or exceeds the "recording start postponement time" is detected, in step S142, the data processing section 101 reads the archiving-allowed data from the local cache section 104 to start processing of transferring the archiving-allowed data to the library 102 and recording the transferred archiving-allowed data.

This processing is performed by the cache manager 124, the file system control section 121, the library processing section 125, and the library access section 126 of the data processing section 101 illustrated in FIG. 4.

The cache manager 124 reads, from the local cache section 104, the archiving-allowed data whose elapsed time after caching is equal to or exceeds the "recording start postponement time", and the library processing section 125 and the library access section 126 output this data to the library control section 103 to control the library control section 103 to perform processing of recording the data in the library 102.

Note that the library processing section (REST client) 125 and the library access section (REST API) 126 perform data recording by using an API for accessing the library 102.

The processing of recording data on the media of the library 102 is time-consuming processing.

(Step S143)

Next, the data processing section 101 of the archive device 100 determines whether or not access from an external user device 20 to data (cache data) whose recording processing in the library 102 is currently performed has occurred.

Note that the cache data is basically continuously held in the local cache section 104 during and after the recording processing in the library 102, and is not erased immediately. Note that the data erase processing performed on the local cache section 104 will be described later with reference to flowcharts illustrated in FIG. 9 and subsequent drawings.

The user device 20 can immediately access and open the cache data continuously held in the local cache section 104 by using an existing file system (the NTFS or the like).

In step S143, the data processing section 101 determines whether or not the access from the external user device 20 to the data (cache data) whose recording processing in the library 102 is currently performed has occurred.

In a case where the access has not occurred, the flow proceeds to step S144.

In a case where the access has occurred, the flow proceeds to step S145.

(Step S144)

The processing of step S144 is processing performed in a case where it is determined in step S143 that the access from the external user device 20 to the data (cache data) whose recording processing in the library 102 is currently performed has not occurred.

In this case, the data processing section 101 determines in step S144 whether or not the data recording processing in the library 102 is completed, and in a case where the data recording processing is not completed, the flow returns to step S142 and the processing of steps S142 to S144 is repeated.

In a case where it is determined in step S144 that the data recording processing in the library 102 is completed, the processing ends.

(Step S145)

The processing of steps S145 to S147 is processing performed in a case where it is determined in step S143 that the access from the external user device 20 to the data (cache data) whose recording processing in the library 102 is currently performed has occurred.

In this case, in step S145, the data processing section 101 stops the recording processing of the data (cache data) whose recording processing in the library 102 is currently performed.

Note that, as described above, the data (cache data) whose recording processing in the library 102 is currently performed is continuously saved in the local cache section 104.

(Step S146)

Next, in step S146, the data processing section 101 stops measurement of the elapsed time after caching, corresponding to the cache data whose recording processing in the library 102 is currently performed, resets measurement data, such that the elapsed time becomes 0 (elapsed time=0).

(Step S147)

Moreover, in step S147, the data processing section 101 starts measurement of the elapsed time after caching after the re-access processing for the cache data as the re-access target is completed.

In this way, in a case where the re-access to the data whose transferring processing and recording processing to and in the library 102 are currently performed among the data saved in the local cache section 104 has occurred, the data processing section 101 of the archive device 100 stops the measurement of the elapsed time after caching, and restarts the measurement of the elapsed time from 0 after the access is completed.

By performing such processing, it is possible to reduce unnecessary data recording in the library 102.

As described above, in the configuration of the present disclosure, data recorded in the local cache section 104 is transferred to the library 102 and recorded after the pre-specified postponement time elapses. Moreover, even after transferring and recording to and in the library 102 start after the postponement time has elapsed, in a case where re-access occurs, the transferring and recording to and in the library 102 are stopped, measurement of the elapsed time after the data is cached is stopped, and resetting is performed.

By performing such processing, it is possible to reduce unnecessary data recording on the write-once recording media of the library 102. Furthermore, the frequency of data transfer from the local cache section 104 to the library 102 and recording processing in the archive device 100 can be reduced, such that power consumption can be reduced.

[4-4. (Processing 4) Processing Sequence of Data Erase Processing Performed on Local Cache Section 104]

Next, a processing sequence of the data erase processing performed on the local cache section 104 will be described with reference to the flowcharts illustrated in FIGS. 9 and 10.

A large amount of data is recorded in the local cache section 104 over time, and eventually, a recording capacity of the local cache section 104 reaches an upper limit. In such a state, in order to record new data in the local cache section 104, it is necessary to erase some of the data recorded in the local cache section 104.

The flowcharts illustrated in FIGS. 9 and 10 below are flowcharts for describing the processing sequence of this processing, that is, the data erase processing performed on the local cache section 104.

Hereinafter, processing of each step of the flowchart illustrated in FIGS. 9 and 10 will be described.

(Step S201)

First, in step S201, the data processing section 101 of the archive device 100 detects generation of "new cache data" newly saved in the local cache section 104.

(Step S202)

Next, in step S202, the data processing section 101 compares a volume of the "new cache data" with an available capacity of the local cache section 104.

Volume of New Cache Data<Available Capacity (Determination Formula)

In a case where the above (Determination Formula) is satisfied, the flow proceeds to step S203.

On the other hand, in a case where the above (Determination Formula) is not satisfied, the flow proceeds to step S204.

(Step S203)

Volume of New Cache Data<Available Capacity (Determination Formula)

In a case where it is determined in step S202 that the above (Determination Formula) is satisfied, the flow proceeds to step S203.

In a case where the above (Determination Formula) is satisfied, it is possible to save the "new cache data" in the local cache section 104, and the data processing section 101 saves the "new cache data" in the local cache section 104 in step S203.

(Step S204)

Volume of New Cache Data<Available Capacity (Determination Formula)

On the other hand, in a case where it is determined in step S202 that the above (Determination Formula) is not satisfied, the flow proceeds to step S204.

In a case where the above (Determination Formula) is not satisfied, it is not possible to save the "new cache data" in the local cache section 104.

In this case, first, in step S204, the data processing section 101 determines whether or not data whose recording in the library 102 is completed exists in cached data that are already saved in the local cache section 104.

In a case where the data whose recording in the library 102 is completed exists, the flow proceeds to step SS205.

On the other hand, in a case where the data whose recording in the library 102 is completed does not exist, the flow proceeds to step S221.

(Step S205)

The processing of step S205 is processing performed when it is determined in step S204 that the data whose recording in the library 102 is completed exists.

In this case, in step S205, the data processing section 101 selects data whose recording in the library 102 is completed, and selectively erases, from these data, data to be erased according to a pre-specified algorithm, for example, first-in first-out (FIFO), least recently used (LRU), or the like.

After performing this processing, the flow returns to step S202, and the processing of step S202 and subsequent steps is repeated.

(Step S221)

The processing of step S221 is processing performed when it is determined in step S204 that the data whose recording in the library 102 is completed does not exist in the local cache section 104.

In this case, in step S221, the data processing section 101 determines whether or not data whose recording processing in the library 102 is currently performed exists in saved data in the local cache section 104.

In a case where the data whose recording processing in the library 102 is currently performed exists, the flow proceeds to step S222.

On the other hand, in a case where the data whose recording processing in the library 102 is currently performed does not exist, the flow proceeds to step S224.

(Step S222)

The processing of step S222 is processing performed when it is determined in step S221 that the data whose recording processing in the library 102 is currently performed exists.

In this case, in step S222, the data processing section 101 waits until the recording processing of the data whose recording processing in the library 102 is currently performed is completed.

(Step S223)

Moreover, in step S223, the data processing section 101 determines whether or not the recording processing of the data whose recording processing in the library 102 is currently performed is completed, and in a case where the recording processing is not completed, the processing of steps S222 to S223 is repeated.

In a case where it is determined in step S223 that the recording processing of the data whose recording processing in the library 102 is currently performed is completed, the flow returns to step S202, and the processing of step S202 and subsequent steps is repeated.

(Step S224)

The processing of step S224 is processing performed when it is determined in step S221 that the data whose recording processing in the library 102 is currently performed does not exist.

In other words, data whose library recording is completed and data whose library recording is currently performed do not exist in cached data, that is, data that is not recorded in the library exists. In this case, in step S224, the data processing section 101 performs erase processing of cache data saved in the local cache section 104 according to a pre-specified algorithm.

However, the erase processing is performed after recording of unrecorded data in the library. Moreover, at the time of recording the unrecorded data in the library, the recording start postponement time is ignored, the library recording start permission flag becomes 1 (recording start permitted), and the recording processing is immediately performed on the library.

The pre-specified algorithm is, for example, an algorithm such as First-in First-out (FIFO), least recently used (LRU), or the like.

The cache data to be erased is selected and erased by using any of these algorithms.

After performing the erase processing, the flow returns to step S202, and the processing of step S202 and subsequent steps is repeated.

Note that the processing according to the flows illustrated in FIGS. 9 and 10 is performed by the file system control section 121 and the cache manager 124 of the data processing section 101 illustrated in FIG. 4.

By performing the processing according to the flows illustrated in FIGS. 9 and 10, it is possible to secure a new cache data recording area in the local cache section 104.

5. Hardware Configuration Example of Archive Device

Next, a hardware configuration example of the archive device 100 that performs the above-described processing and the user device 20 will be described with reference to FIG. 11.

Figure 11:
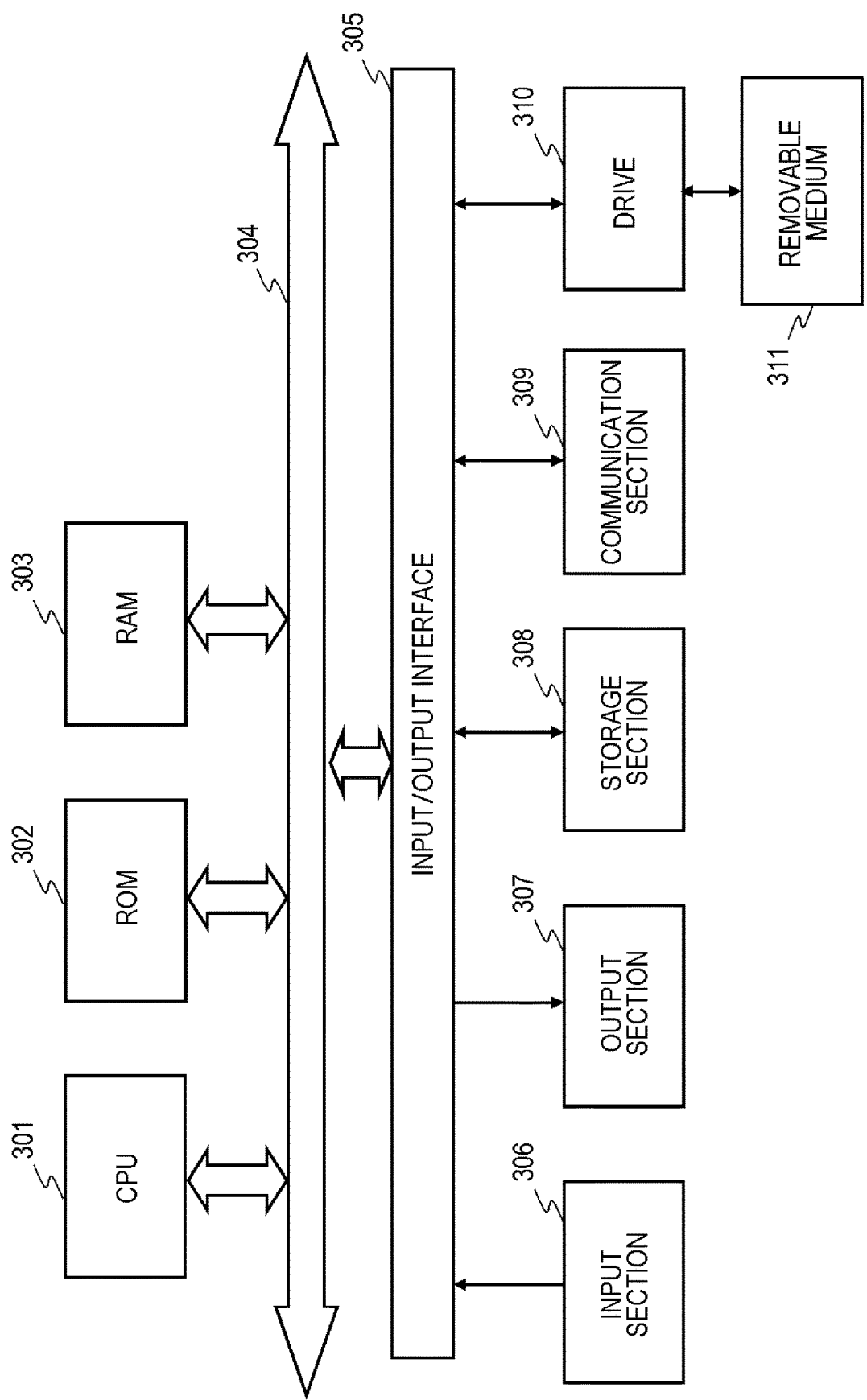
FIG. 11 is a diagram for describing a hardware configuration example of the information processing device configured as the archive device or the user device.

FIG. 11 is a diagram illustrating a configuration example of hardware applicable as the archive device 100 and the user device 20.

The configuration illustrated in FIG. 11 will be described.

A central processing unit (CPU) 301 functions as a data processing section that performs various processing according to a program stored in a read only memory (ROM) 302 or a storage section 308. For example, the CPU 301 performs processing according to the sequence described in the above embodiment. A random access memory (RAM) 303 stores a program executed by the CPU 301, data, and the like. The CPU 301, the ROM 302, and the RAM 303 are connected to one another by a bus 304.

The CPU 301 is connected to an input/output interface 305 via the bus 304, and an input section 306 including various switches, a keyboard, a touch panel, a mouse, a microphone, and the like, and an output section 307 including a display, a speaker, and the like, are connected to the input/output interface 305.

The CPU 301 inputs a command, situation data, or the like, input from the input section 306, performs various processing, and outputs processing results to, for example, the output section 307.

The storage section 308 connected to the input/output interface 305 includes, for example, a hard disk or the like, and stores a program executed by the CPU 301 and various data. A communication section 309 functions as a transmission/reception section for data communication using a network such as the Internet or a local area network, and performs communication with an external device.

A drive 310 connected to the input/output interface 305 drives a removable medium 311 such as a magnetic disc, an optical disc, a magneto-optical disc, or a semiconductor memory such as a memory card or the like, and performs recording or reading of data.

In a case of the archive device 100 of the present disclosure, the drive 310 and the removable medium 311 illustrated in FIG. 11 include the following two types:

(a) a drive and removable medium corresponding to the local cache section 104 illustrated in FIG. 2; and (b) a drive and removable medium corresponding to the library control section 103 and the library 102 illustrated in FIG. 2.

6. Application Example

The technology according to the present disclosure can be applied to various products. For example, the technology according to the present disclosure may be applied to a surgery room system.

Figure 12:
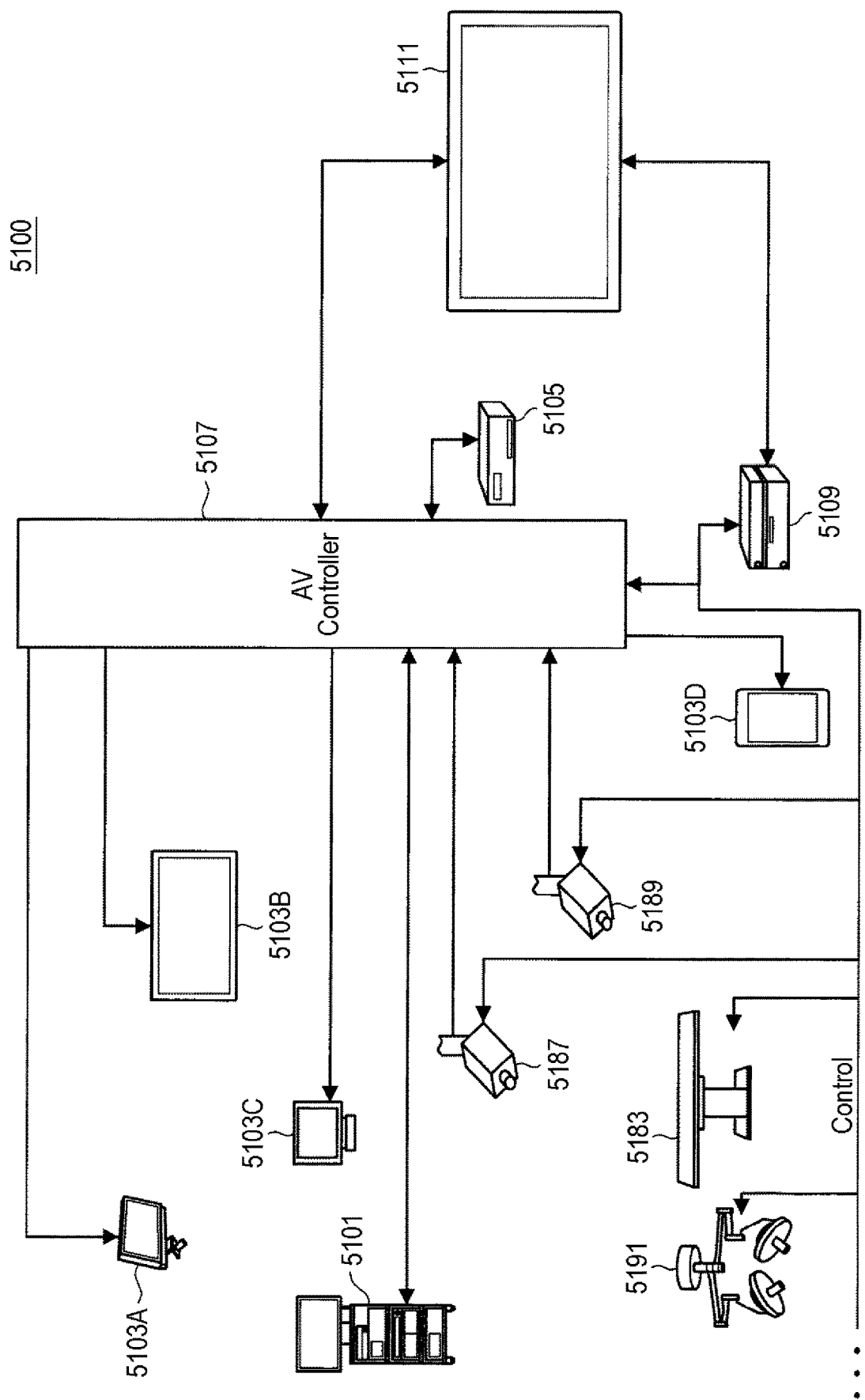
FIG. 12 is a diagram schematically illustrating an overall configuration of a surgery room system.

FIG. 12 is a diagram schematically illustrating an overall configuration of a surgery room system 5100 to which the technology according to the present disclosure can be applied. Referring to FIG. 12, the surgery room system 5100 is configured by connecting a group of devices installed in a surgery room in a cooperative manner via an audiovisual (AV) controller 5107 and a surgery room control device 5109.

Various devices can be installed in the surgery room. FIG. 12 illustrates, as an example, a device group 5101 of various devices for an endoscopic surgery, a ceiling camera 5187, a surgery field camera 5189, a plurality of display devices 5103A to 5103D, a recorder 5105, a patient bed 5183, and a light 5191, the ceiling camera 5187 being provided on the ceiling of the surgery room and capturing an image of the hands of a surgeon, the surgery field camera 5189 being provided on the ceiling of the surgery room and capturing an image of the entire surgery room.

Here, among these devices, the device group 5101 belongs to an endoscopic surgery system 5113 as described later and includes an endoscope, a display device which displays an image captured by the endoscope, and the like. The respective devices belonging to the endoscopic surgery system 5113 are also referred to as medical equipment. Meanwhile, the display devices 5103A to 5103D, the recorder 5105, the patient bed 5183, and the light 5191 are devices which are equipped in, for example, the surgery room, separately from the endoscopic surgery system 5113. These devices that do not belong to the endoscopic surgery system 5113 are also referred to as non-medical equipment. The AV controller 5107 and/or the surgery room control device 5109 controls the operation of the medical equipment and the non-medical equipment in cooperation with each other.

The AV controller 5107 performs an overall control of processing related to image display on the medical equipment and non-medical equipment. Specifically, among the devices included in the surgery room system 5100, the device group 5101, the ceiling camera 5187, and the surgery field camera 5189 can be devices (hereinafter, also referred to as a transmission source device) having a function of transmitting information to be displayed during the surgery (hereinafter, also referred to as display information). Further, the display devices 5103A to 5103D can be devices (hereinafter, also referred to as output destination devices) to which the display information is output. Further, the recorder 5105 can be a device corresponding to both a transmission source device and an output destination device. The AV controller 5107 has a function of controlling operation of a transmission source device and an output destination device to acquire display information from the transmission source device and transmit the display information to the output destination device so as to be displayed or recorded. Note that the display information includes various images captured during the surgery, various information related to the surgery (for example, physical information of a patient, a past inspection result, information regarding a surgical procedure, and the like), and the like.

Specifically, information regarding an image of a surgical site in a body cavity of a patient captured by the endoscope can be transmitted as the display information from the device group 5101 to the AV controller 5107. In addition, information regarding an image of the hands of the surgeon captured by the ceiling camera 5187 can be transmitted as the display information from the ceiling camera 5187. In addition, information regarding an image of the entire surgery room captured by the surgery field camera 5189 can be transmitted as the display information from the surgery field camera 5189. Note that in a case where another device having an image capturing function exists in the surgery room system 5100, the AV controller 5107 may also acquire, as the display information, information regarding an image captured by the another device from the another device.

Alternatively, for example, information regarding these images captured in the past is recorded in the recorder 5105 by the AV controller 5107. The AV controller 5107 can acquire, as the display information, information regarding the image captured in the past from the recorder 5105. Note that various information regarding the surgery may be recorded in advance in the recorder 5105.

The AV controller 5107 controls at least one of the display devices 5103A to 5103D, which are the output destination device, to display the acquired display information (that is, an image captured during the surgery and various information related to the surgery). In the illustrated example, the display device 5103A is a display device installed so as to be suspended from the ceiling of the surgery room, the display device 5103B is a display device installed on a wall surface of the surgery room, the display device 5103C is a display device installed on a desk in the surgery room, and the display device 5103D is mobile equipment (for example, a tablet PC) having a display function.

Further, although not illustrated in FIG. 12, the surgery room system 5100 may include a device outside the surgery room. The device outside the surgery room can be, for example, a server connected to a network constructed inside or outside a hospital, a PC used by a medical staff, a projector installed in a conference room of the hospital, or the like. In a case where such a device outside the surgery room is located outside the hospital, the AV controller 5107 can also control to display the display information on a display device of another hospital via a video conferencing system or the like for telemedicine.

The surgery room control device 5109 performs an overall control of processing other than processing related to image display in non-medical equipment. For example, the surgery room control device 5109 controls driving of the patient bed 5183, the ceiling camera 5187, the surgery field camera 5189, and the light 5191.

A centralized operation panel 5111 is provided in the surgery room system 5100, and the user can issue an instruction regarding image display to the AV controller 5107 or issue an instruction regarding operation of the non-medical equipment to the surgery room control device 5109 through the centralized operation panel 5111. The centralized operation panel 5111 is configured by providing a touch panel on a display surface of the display device.

Figure 13:
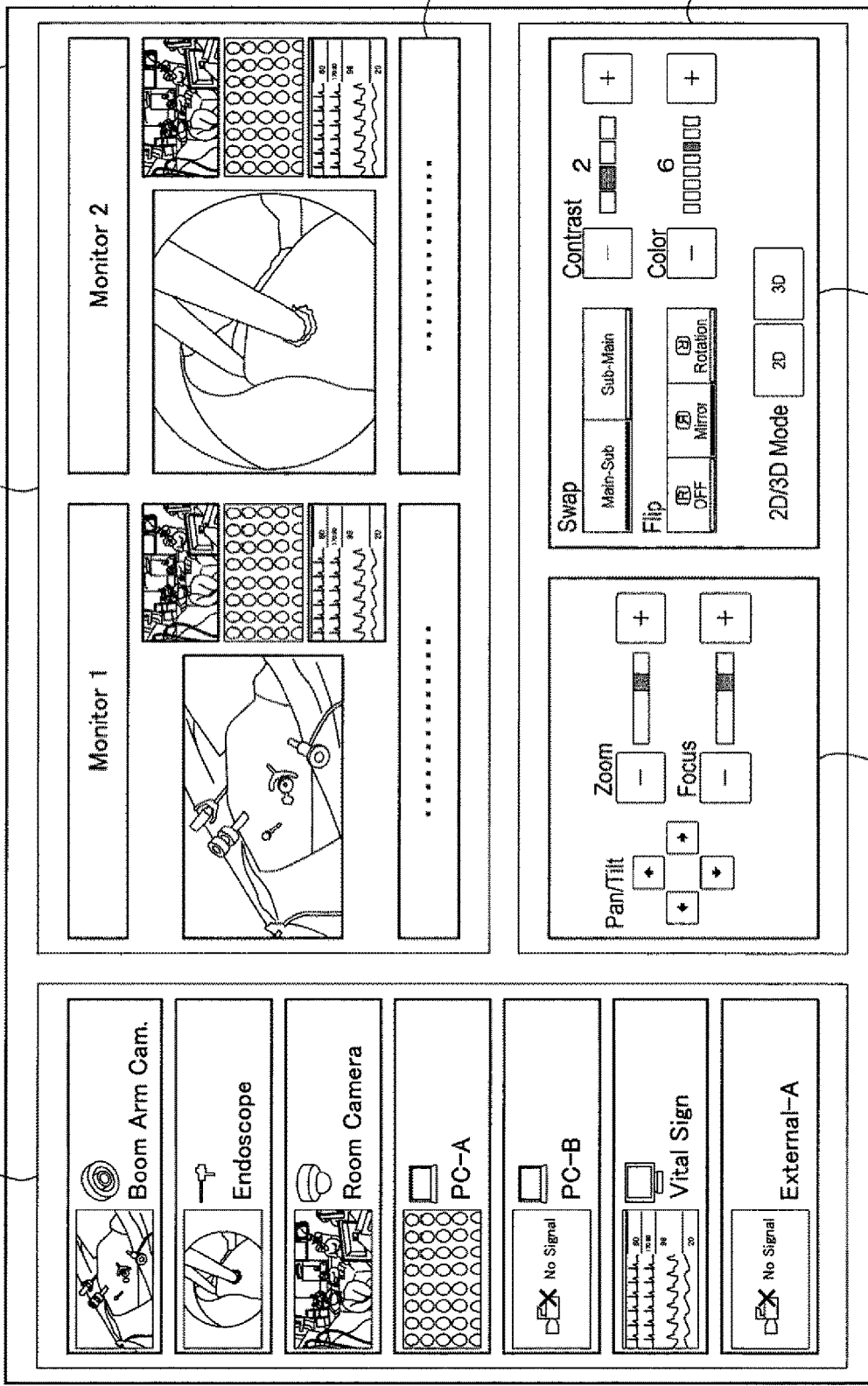
FIG. 13 is a view illustrating a display example of an operation screen in a centralized operation panel.

FIG. 13 is a view illustrating a display example of an operation screen in the centralized operation panel 5111. FIG. 13 illustrates, as an example, an operation screen corresponding to a case where two display devices are provided as output destination devices in the surgery room system 5100. Referring to FIG. 13, a transmission source selection area 5195, a preview area 5197, and a control area 5201 are provided in the operation screen 5193.

In the transmission source selection area 5195, a transmission source device included in the surgery room system 5100 and a thumbnail screen image representing display information of the transmission source device are displayed in an associated manner. The user can select display information to be displayed on the display device from any of the transmission source devices displayed in the transmission source selection area 5195.

In the preview area 5197, a preview of screen images displayed on two display devices (Monitor 1 and Monitor 2), which are output destination devices, is displayed. In the illustrated example, four images are displayed by picture-in-picture (PinP) display on one display device. The four images correspond to the display information transmitted from the transmission source device selected in the transmission source selection area 5195. One of the four images is displayed in a relatively large size as a main image while the remaining three images are displayed in a relatively small size as sub images. The user can exchange between the main image and the sub image by appropriately selecting an area where the four images are displayed. In addition, a status display area 5199 is provided below the area where the four images are displayed, and a status related to the surgery (for example, an elapsed time of the surgery, physical information of a patient, or the like) is appropriately displayed in the status display area 5199.

A transmission source operation area 5203, in which a graphical user interface (GUI) part for performing an operation on a transmission source device is displayed, and an output destination operation area 5205, in which a GUI part for performing an operation on an output destination device is displayed, are provided in the control area 5201. In the illustrated example, GUI parts for performing various operations (panning, tilting, and zooming) on a camera in a transmission source device having an image capturing function are provided in the transmission source operation area 5203. The user can control operation of the camera in the transmission source device by appropriately selecting these GUI parts. Note that, although not illustrated, in a case where the transmission source device selected in the transmission source selection area 5195 is the recorder (that is, in a case where an image recorded in the recorder in the past is displayed in the preview area 5197), GUI parts for performing operations such as reproduction of the image, stopping of reproduction, rewinding, fast-feeding, and the like can be provided in the transmission source operation area 5203.

Further, GUI parts for performing various operations for display on the display device which is an output destination device (swap, flip, color adjustment, contrast adjustment, and switching between two-dimensional (2D) display and three-dimensional (3D) display) are provided in the output destination operation area 5205. The user can control the display on the display device by appropriately selecting these GUI parts.

Note that the operation screen displayed on the centralized operation panel 5111 is not limited to the illustrated example, and the user may be able to operate each device which can be controlled by the AV controller 5107 and the surgery room control device 5109 included in the surgery room system 5100 through the centralized operation panel 5111.

Figure 14:
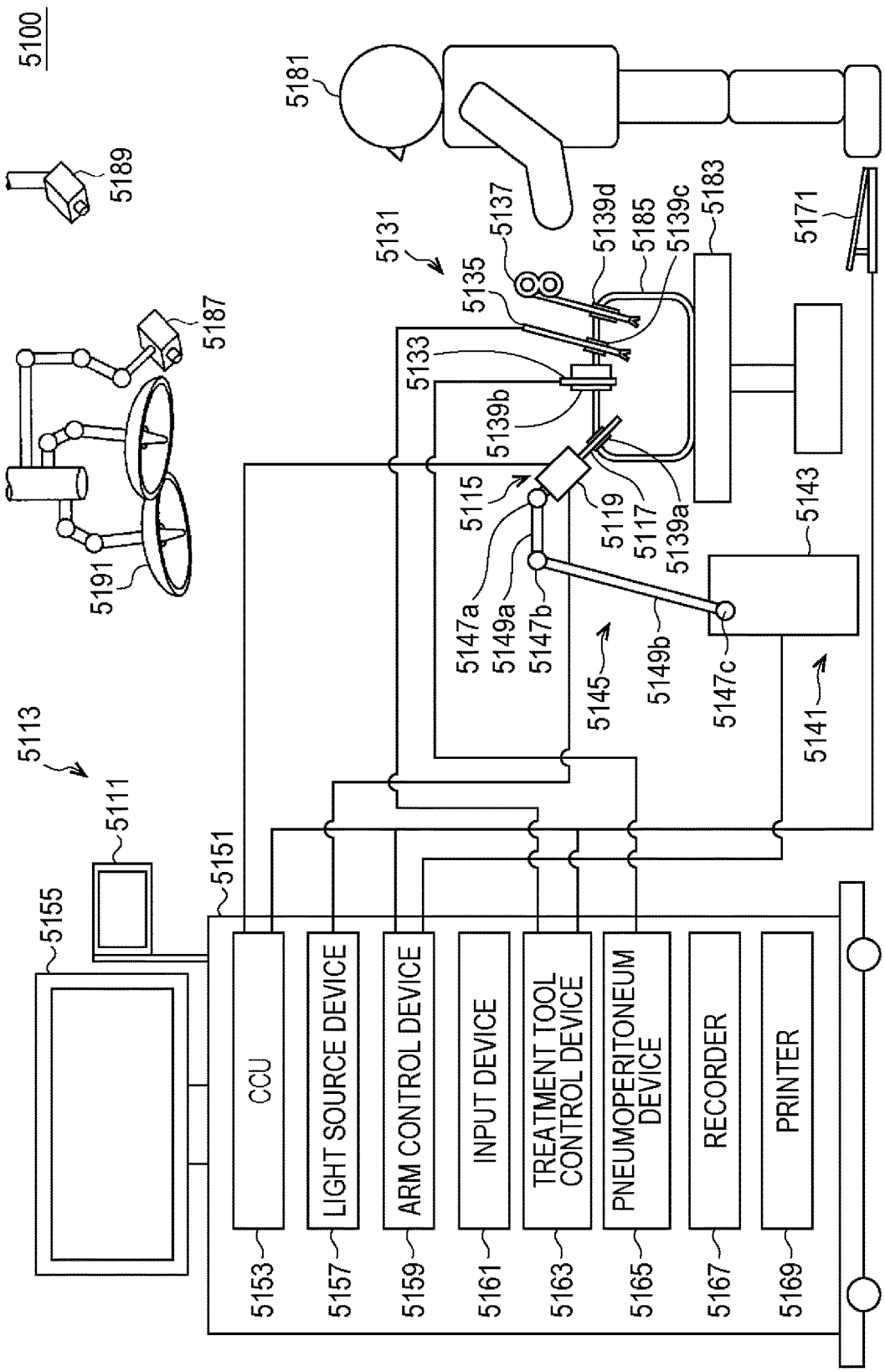
FIG. 14 is a diagram illustrating an example of a surgery in which the surgery room system is applied.

FIG. 14 is a diagram illustrating an example of a surgery in which the surgery room system described above is applied. The ceiling camera 5187 and the surgery field camera 5189 are provided on the ceiling of the surgery room and can capture an image of the hands of a surgeon (medical doctor) 5181 who performs treatment for an affected area of a patient 5185 on the patient bed 5183 and the entire surgery room. The ceiling camera 5187 and the surgery field camera 5189 may have a magnification adjustment function, a focal distance adjustment function, an image capturing direction adjustment function, and the like. The light 5191 is provided on the ceiling of the surgery room and irradiates at least the hands of the surgeon 5181 with light. The light 5191 may be configured so that the irradiation light amount, the wavelength (color) of the irradiation light, the irradiation direction of light, and the like can be appropriately adjusted.

The endoscopic surgery system 5113, the patient bed 5183, the ceiling camera 5187, the surgery field camera 5189, and the light 5191 are connected to one another in a cooperative manner through the AV controller 5107 and the surgery room control device 5109 (not illustrated in FIG. 14) as illustrated in FIG. 12. The centralized operation panel 5111 is provided in the surgery room, and the user can appropriately operate these devices present in the surgery room through the centralized operation panel 5111 as described above.

Hereinafter, a configuration of the endoscopic surgery system 5113 will be described in detail. As illustrated in FIG. 14, the endoscopic surgery system 5113 includes an endoscope 5115, other surgical tools 5131, a support arm device 5141 supporting the endoscope 5115, and a cart 5151 in which various devices for the endoscopic surgery are loaded.

In the endoscopic surgery, in place of incising the abdominal wall to perform laparotomy, a plurality of tubular aperture devices, which is called trocars 5139a to 5139d, is used to puncture the abdominal wall. Then, a lens barrel 5117 of the endoscope 5115, and the other surgical tools 5131 are inserted into the body cavity of the patient 5185 through the trocars 5139*a* to 5139*d*. In the illustrated example, as the other surgical tools 5131, a pneumoperitoneum tube 5133, an energy treatment tool 5135, and forceps 5137 are inserted into the body cavity of the patient 5185. Further, the energy treatment tool 5135 is a treatment tool for incising and peeling a tissue, sealing a blood vessel, or the like by using a high-frequency current or ultrasonic vibration. However, the illustrated surgical tools 5131 are merely an example, and various surgical tools which are generally used in the endoscopic surgery, such as, for example, tweezers, a retractor, and the like, may be used as the surgical tools 5131.

An image of the surgical site in the body cavity of the patient 5185 captured by the endoscope 5115 is displayed on a display device 5155. The surgeon 5181 uses the energy treatment tool 5135 and the forceps 5137 to perform treatment such as excising the affected area while viewing the image of the surgical site displayed on the display device 5155 in real time. Note that, although not illustrated, the pneumoperitoneum tube 5133, the energy treatment tool 5135, and the forceps 5137 are supported by the surgeon 5181, an assistant, or the like during the surgery.

(Support Arm Device)

The support arm device 5141 includes an arm portion 5145 extending from a base portion 5143. In the illustrated example, the arm portion 5145 includes joint portions 5147*a*, 5147*b*, and 5147*c*, and links 5149*a* and 5149*b*, and is driven under the control of the arm control device 5159. The endoscope 5115 is supported by the arm portion 5145, such that the position and the posture of the endoscope 5115 are controlled. Therefore, the position of the endoscope 5115 can be stably fixed.

(Endoscope)

The endoscope 5115 includes a lens barrel 5117 of which an area having a predetermined length from a distal end is inserted into the body cavity of the patient 5185, and a camera head 5119 connected to a proximal end of the lens barrel 5117. In the example illustrated in FIG. 14, the endoscope 5115 implemented as a so-called hard mirror including the hard lens barrel 5117 is illustrated, but the endoscope 5115 may also be implemented as a so-called flexible mirror including the flexible lens barrel 5117.

An opening portion in which an object lens is fitted is provided in the distal end of the lens barrel 5117. A light source device 5157 is connected to the endoscope 5115, and light generated by the light source device 5157 is guided to the distal end of the lens barrel by a light guide extending in the inside of the lens barrel 5117, and radiated to an observation target in the body cavity of the patient 5185 through the object lens. Note that the endoscope 5115 may be a forward-viewing endoscope, an oblique-viewing endoscope, or a side-viewing endoscope.

An optical system and an image capturing element are provided in the camera head 5119, and reflected light (observation light) from the observation target is collected to the image capturing element by the optical system. The observation light is subjected to photoelectrical conversion by the image capturing element, and an electric signal corresponding to the observation light, that is, an image signal corresponding to an observation image is generated. The image signal is transmitted as RAW data to a camera control unit (CCU) 5153. Note that the camera head 5119 has a function of adjusting the magnification and the focal distance by appropriately driving the optical system thereof.

Note that a plurality of image capturing elements is provided in the camera head 5119 in order to support, for example, stereoscopic viewing (3D display) or the like. In this case, a plurality of relay optical systems is provided inside the lens barrel 5117 in order to guide the observation light to each of the plurality of image capturing elements.

(Various Devices Mounted on Cart)

The CCU 5153 includes a central processing unit (CPU), a graphics processing unit (GPU), and the like, and performs an overall control of operations of the endoscope 5115 and the display device 5155. Specifically, the CCU 5153 performs, on an image signal received from the camera head 5119, various image processing for displaying an image based on the image signal, such as development processing (demosaic processing) or the like. The CCU 5153 provides the image signal subjected to the image processing to the display device 5155. Further, the AV controller 5107 illustrated in FIG. 12 is connected to the CCU 5153. The CCU 5153 also provides the image signal subjected to the image processing to the AV controller 5107. Furthermore, the CCU 5153 also transmits a control signal to the camera head 5119 to control driving of the camera head 5119. The control signal can include information regarding an image capturing condition such as the magnification, the focal distance, or the like. The information regarding the image capturing condition may be input via an input device 5161 or may be input via the centralized operation panel 5111 described above.

The display device 5155 displays an image based on the image signal subjected to the image processing by the CCU 5153 under the control of the CCU 5153. In a case where the endoscope 5115 is compatible with high-resolution image capturing such as 4K (horizontal pixel count 3840×vertical pixel count 2160), 8K (horizontal pixel count 7680×vertical pixel count 4320), or the like, and/or is compatible with the 3D display, as the display device 5155, a display device, by which high-resolution display and/or 3D display corresponding to the above cases, respectively, are possible, may be used as the display device 5155. In a case where the display device is compatible with the high-resolution image capturing such as 4K, 8K, or the like, a more immersive experience can be obtained by using a display device with a size of 55 inches or more as the display device 5155. Further, a plurality of display devices 5155 having different resolutions and sizes may be provided in accordance with purposes.

The light source device 5157 includes a light source such as a light emitting diode (LED) or the like, and supplies, to the endoscope 5115, irradiation light at the time of capturing an image of a surgical site or the like.

The arm control device 5159 includes a processor such as a CPU or the like, and is operated according to a predetermined program to control driving of the arm portion 5145 of the support arm device 5141 according to a predetermined control method.

The input device 5161 is an input interface for the endoscopic surgery system 5113. The user can input various information or instruction to the endoscopic surgery system 5113 via the input device 5161. For example, the user inputs various information related to the surgery, such as physical information of the patient and information regarding the surgical procedure, via the input device 5161. Further, for example, the user inputs, via the input device 5161, an instruction to drive the arm portion 5145, an instruction to change the image capturing condition (the type of irradiation light, the magnification, the focal distance, or the like) by the endoscope 5115, an instruction to drive the energy treatment tool 5135, and the like.

The type of the input device 5161 is not limited, and the input device 5161 may be one of various known input devices. As the input device 5161, for example, a mouse, a keyboard, a touch panel, a switch, a foot switch 5171, a lever, and/or the like can be applied. In a case where a touch panel is used as the input device 5161, the touch panel may be provided on a display surface of the display device 5155.

Alternatively, the input device 5161 is a device to be mounted on the user, such as a glasses-type wearable device, a head mounted display (HMD), or the like, and various inputs are made according to a gesture or a line-of-sight of the user detected by these devices. Further, the input device 5161 includes a camera capable of detecting a motion of the user, and various inputs are made according to a gesture or a line-of-sight of the user detected from an image captured by the camera. Moreover, the input device 5161 includes a microphone capable of collecting the voice of the user, and various inputs are made by voice through the microphone. In this way, the input device 5161 is configured so that various information can be input in a non-contact manner, such that, particularly, a user belonging to a clean area (for example, the surgeon 5181) can operate equipment belonging to an unclean area in a non-contact manner. In addition, since the user can operate the equipment without taking his/her hand off the surgical tool held by the user, the convenience of the user is improved.

A treatment tool control device 5163 controls driving of the energy treatment tool 5135 for cauterizing or incising tissues, sealing a blood vessel, or the like. In order to inflate the body cavity of the patient 5185 for the purpose of securing a field of view of the endoscope 5115 and a working space of the surgeon, the pneumoperitoneum device 5165 feeds gas into the body cavity through the pneumoperitoneum tube 5133. A recorder 5167 is a device capable of recording various information regarding the surgery. A printer 5169 is a device capable of printing various information regarding the surgery in various forms such as a text, an image, a graph, and the like.

Hereinafter, a particularly characteristic configuration of the endoscopic surgery system 5113 will be described in more detail.

(Support Arm Device)

The support arm device 5141 includes the base portion 5143 serving as a base and the arm portion 5145 extending from the base portion 5143. In the illustrated example, the arm portion 5145 includes the plurality of joint portions 5147a, 5147b, and 5147c and the plurality of links 5149a and 5149b connected to each other by the joint portion 5147b. In FIG. 14, however, for simplified illustration, the configuration of the arm portion 5145 is illustrated in a simplified form. Actually, the shape, number, and arrangement of the joint portions 5147a to 5147c and the links 5149a and 5149b, the directions of rotation axes of the joint portions 5147a to 5147c, and the like can be appropriately set so that the arm portion 5145 has a desired degree of freedom. For example, preferably, the arm portion 5145 can be configured to have six degrees of freedom or more. As a result, the endoscope 5115 can be freely moved within a movable range of the arm portion 5145, such that the lens barrel 5117 of the endoscope 5115 can be inserted into the body cavity of the patient 5185 from a desired direction.

An actuator is provided in each of the joint portions 5147a to 5147c, and the joint portions 5147a to 5147c are each configured so as to be rotatable around a predetermined rotation axis by driving of the actuator. The driving of the actuator is controlled by the arm control device 5159 to control a rotation angle of each of the joint portions 5147a to 5147c, such that driving of the arm portion 5145 is controlled. As a result, a control of the position and posture of the endoscope 5115 can be implemented. At this time, the arm control device 5159 can control the driving of the arm portion 5145 by various known control methods such as a force control or position control.

For example, as the surgeon 5181 appropriately performs an input operation via the input device 5161 (including the foot switch 5171), the driving of the arm portion 5145 is appropriately controlled by the arm control device 5159 according to the input operation, such that the position and posture of the endoscope 5115 may be controlled. By the above-described control, the endoscope 5115 at a distal end of the arm portion 5145 can be moved from an arbitrary position to an arbitrary position, and then fixedly supported at the position after the movement. Note that the arm portion 5145 may be operated by a so-called master-slave manner. In this case, the arm portion 5145 can be remotely controlled by the user via the input device 5161 installed at a place remote from the surgery room.

Further, in a case where the force control is applied, the arm control device 5159 may perform a so-called power-assisted control to drive the actuator of each of the joint portions 5147a to 5147c so that the arm portion 5145 receives an external force from the user and smoothly moves following the external force. As a result, when the user moves the arm portion 5145 while directly touching the arm portion 5145, the arm portion 5145 can be moved with a relatively weak force. Accordingly, the user can more intuitively move the endoscope 5115 with a simpler operation, and thus, the convenience of the user can be improved.

Here, in general, in the endoscopic surgery, the endoscope 5115 has been supported by a doctor called a scopist. On the other hand, in a case of using the support arm device 5141, the position of the endoscope 5115 can be fixed more reliably without manual operation, and therefore, an image of the surgical site can be stably obtained, such that the surgery can be smoothly performed.

Note that the arm control device 5159 does not necessarily have to be provided in the cart 5151. Further, the arm control device 5159 does not necessarily have to be a single device. For example, the arm control device 5159 may be provided in each of the joint portions 5147a to 5147c of the arm portion 5145 of the support arm device 5141, and a plurality of arm control devices 5159 may cooperate with each other to implement a control of the driving of the arm portion 5145.

(Light Source Device)

The light source device 5157 supplies, to the endoscope 5115, the irradiation light for capturing an image of the surgical site. The light source device 5157 includes a white light source including, for example, an LED, a laser light source, or a combination thereof. Here, in a case where the white light source is implemented by a combination of red, green, and blue (RGB) laser light sources, since an output intensity and an output timing of each color (each wavelength) can be controlled with high precision, it is possible to adjust white balance of a captured image in the light source device 5157. Furthermore, in this case, laser light from each of the RGB laser light sources is radiated to the observation target in a time-division manner, and driving of the image capturing element of the camera head 5119 is controlled in synchronization with the irradiation timings, such that it is possible to capture an image corresponding to each of RGB in a time-division manner. According to the above-described method, it is possible to obtain a color image without providing a color filter in the image capturing element.

Furthermore, driving of the light source device 5157 may be controlled so that an intensity of output light is changed at each predetermined time. Driving of the image capturing element of the camera head 5119 is controlled in synchronization with a timing of a change of the light intensity to acquire an image in a time-division manner, and the image is synthesized, such that it is possible to generate an image with a high dynamic range and without so-called blown-out highlights and blocked-up shadows.

Furthermore, the light source device 5157 may be configured so that the light source device 5157 can supply light in a predetermined wavelength band corresponding to special light observation. In the special light observation, for example, light in a narrower band in comparison to that of irradiation light (in other words, white light) at the time of general observation is radiated by using a dependence of light absorption of a body tissue on a wavelength, such that so-called narrow band imaging, in which an image of a predetermined tissue such as a blood vessel of a mucous membrane surface layer or the like is captured with high contrast, is performed. Alternatively, in the special light observation, fluorescence observation in which an image is obtained by fluorescence generated by radiation of excited light may be performed. In the fluorescence observation, for example, it is possible to observe fluorescence from a body tissue by radiating excited light to the body tissue (self-fluorescence observation), or obtain a fluorescence image by locally injecting a reagent such as indocyanine green (ICG) or the like into a body tissue and radiating excited light corresponding to a fluorescence wavelength of the reagent to the body tissue. The light source device 5157 can be configured so that the light source device 5157 can supply light in a narrow band and/or excited light corresponding to the special light observation described above.

(Camera Head and CCU)

Figure 15:
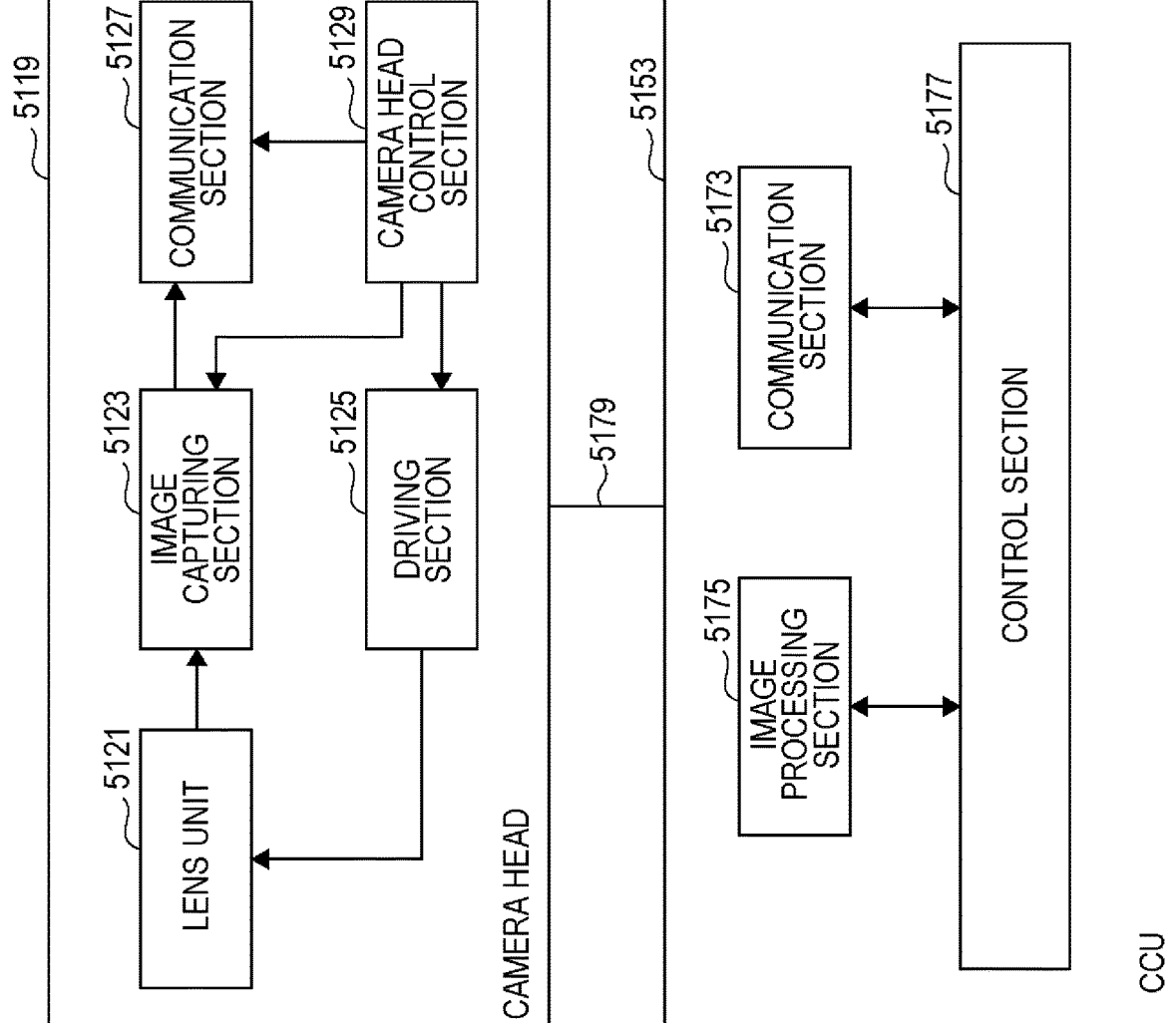
FIG. 15 is a block diagram illustrating an example of functional configurations of a camera head and a camera control unit (CCU) illustrated in FIG. 14.

Functions of the camera head 5119 of the endoscope 5115, and the CCU 5153 will be described in more detail with reference to FIG. 15. FIG. 15 is a block diagram illustrating an example of functional configurations of the camera head 5119 and the CCU 5153 illustrated in FIG. 14.

Referring to FIG. 15, the camera head 5119 includes, as functions thereof, a lens unit 5121, an image capturing section 5123, a driving section 5125, a communication section 5127, and a camera head control section 5129. Further, the CCU 5153 includes, as functions thereof, a communication section 5173, an image processing section 5175, and a control section 5177. The camera head 5119 and the CCU 5153 are connected to be bidirectionally communicable to each other by a transmission cable 5179.

First, the functional configuration of the camera head 5119 will be described. The lens unit 5121 is an optical system provided in a portion of the camera head 5121 connected to the lens barrel 5117. Observation light introduced from the distal end of the lens barrel 5117 is guided to the camera head 5119 and is incident on the lens unit 5121. The lens unit 5121 includes an assembly of a plurality of lenses including a zoom lens and a focus lens. The optical characteristics of the lens unit 5121 are adjusted so as to collect the observation light on a light receiving surface of an image capturing element of the image capturing section 5123. Further, the zoom lens and the focus lens are configured so that positions thereof on an optical axis can be moved in order to adjust the magnification and the focus of a captured image.

The image capturing section 5123 includes an image capturing element and is arranged at a succeeding stage of the lens unit 5121. Observation light that has passed through the lens unit 5121 is collected on the light receiving surface of the image capturing element, and an image signal corresponding to the observation image is generated by photoelectric conversion. The image signal generated by the image capturing section 5123 is provided to the communication section 5127.

As the image capturing element included in the image capturing section 5123, for example, an image capturing element which is a complementary metal oxide semiconductor (CMOS) type image sensor, has a Bayer array, and is capable of capturing a color image, is used. Note that, as the image capturing element, for example, an image capturing element capable of capturing a high-resolution image of 4K or higher may be used. As a high-resolution image of the surgical site is obtained, the surgeon 5181 can comprehend the state of the surgical site in more detail, and can proceed with the surgery more smoothly.

Furthermore, the image capturing element included in the image capturing section 5123 includes a pair of image capturing elements for acquiring each of an image signal for the right eye and an image signal for the left eye that are used for the 3D display. As the 3D display is performed, the surgeon 5181 can more accurately grasp a depth of a biological tissue in the surgical site. Note that in a case where the image capturing section 5123 is configured as the multi-plate type, a plurality of lens units 5121 can be provided for the respective image capturing elements.

Furthermore, the image capturing section 5123 is not required to be necessarily provided in the camera head 5119. For example, the image capturing section 5123 may also be provided inside the lens barrel 5117 right behind the object lens.

The driving section 5125 is implemented by an actuator and moves only a predetermined distance along an optical axis of the zoom lens and the focus lens of the lens unit 5121 according to a control of the camera head control section 5129. With this arrangement, it is possible to appropriately adjust the magnification and focus of an image captured by the image capturing section 5123.

The communication section 5127 is implemented by a communication device for transmitting and receiving various information to and from the CCU 5153. The communication section 5127 transmits an image signal obtained from the image capturing section 5123 as RAW data to the CCU 5153 through the transmission cable 5179. At this time, in order to display the captured image of the surgical site in low latency, it is preferable that the image signal is transmitted by optical communication. This is because, since, at the time of the surgery, the surgeon 5181 performs the surgery while observing the state of the affected area through the captured image, in order to perform the surgery with a higher degree of safety and certainty, it is demanded for a moving image of the surgical site to be displayed in real time as far as possible. In a case where the optical communication is performed, a photoelectric conversion module for converting an electric signal into an optical signal is provided in the communication section 5127. After the image signal is converted into an optical signal by the photoelectric conversion module, the optical signal is transmitted to the CCU 5153 via the transmission cable 5179.

Further, the communication section 5127 receives a control signal for controlling the driving of the camera head 5119 from the CCU 5153. The control signal includes information regarding image capturing conditions, such as information for specifying a frame rate of a captured image, information for specifying an exposure value at the time of image capturing, information for specifying the magnification and focus of a captured image, and/or the like. The communication section 5127 provides the received control signal to the camera head control section 5129. Note that the control signal from the CCU 5153 may also be transmitted by the optical communication. In this case, the photoelectric conversion module that converts an optical signal into an electric signal is provided in the communication section 5127, and the control signal is converted into an electric signal by the photoelectric conversion module and then provided to the camera head control section 5129.

Note that the image capturing conditions such as the frame rate, the exposure value, the magnification, the focus, and the like described above are automatically set by the control section 5177 of the CCU 5153 on the basis of the acquired image signal. That is, the endoscope 5115 has a so-called auto exposure (AE) function, an auto focus (AF) function, and an auto white balance (AWB) function.

The camera head control section 5129 controls the driving of the camera head 5119 on the basis of the control signal received from the CCU 5153 via the communication section 5127. For example, the camera head control section 5129 controls the driving of the image capturing element of the image capturing section 5123 on the basis of the information for specifying a frame rate of a captured image and/or the information for specifying an exposure at the time of image capturing. Further, for example, the camera head control section 5129 appropriately moves the zoom lens and the focus lens of the lens unit 5121 via the driving section 5125 on the basis of the information for specifying the magnification and focus of a captured image. The camera head control section 5129 may further have a function of storing information for identifying the lens barrel 5117 and the camera head 5119.

Note that, by arranging the components such as the lens unit 5121, the image capturing section 5123, and the like in a sealed structure having high airtightness and waterproofness, the camera head 5119 can be made resistant to autoclave sterilization processing.

Next, the functional configuration of the CCU 5153 will be described. The communication section 5173 is implemented by a communication device for transmitting and receiving various information to and from the camera head 5119. The communication section 5173 receives an image signal transmitted from the camera head 5119 via the transmission cable 5179. At this time, as described above, the image signal can be preferably transmitted by the optical communication. In this case, for the optical communication, the photoelectric conversion module that converts an optical signal into an electric signal is provided in the communication section 5173. The communication section 5173 provides, to the image processing section 5175, an image signal converted into an electric signal.

Furthermore, the communication section 5173 transmits, to the camera head 5119, a control signal for controlling the driving of the camera head 5119. The control signal may also be transmitted by the optical communication.

The image processing section 5175 performs various types of image processing on an image signal which is RAW data transmitted from the camera head 5119. The image processing includes various known signal processing such as development processing, image quality improvement processing (band emphasis processing, super-resolution processing, noise reduction (NR) processing, and/or image stabilization processing, and the like), enlargement processing (electronic zoom processing) and/or the like. In addition, the image processing section 5175 performs wave detection processing on an image signal for performing AE, AF, and AWB.

The image processing section 5175 includes a processor such as a CPU or a GPU, and as the processor is operated according to a predetermined program, the above-described image processing and wave detection processing can be performed. Note that in a case where the image processing section 5175 includes a plurality of GPUs, the image processing section 5175 appropriately divides information related to the image signal, and image processing is performed in parallel by the plurality of GPUs.

The control section 5177 performs various controls related to capturing of an image of the surgical site by the endoscope 5115 and display of the captured image. For example, the control section 5177 generates a control signal for controlling the driving of the camera head 5119. At this time, in a case where the image capturing condition is inputted by the user, the control section 5177 generates a control signal on the basis of the input by the user. Alternatively, in a case where the endoscope 5115 has an AE function, an AF function, and an AWB function, the control section 5177 appropriately calculates an optimum exposure value, focal distance, and white balance according to a result of wave detection processing performed by the image processing section 5175, and generates a control signal.

Furthermore, the control section 5177 controls the display device 5155 to display the image of the surgical site on the basis of the image signal subjected to the image processing by the image processing section 5175. At this time, the control section 5177 may recognize various objects in the image of the surgical site by using various image recognition technologies. For example, the control section 5177 can recognize a surgical tool such as forceps or the like, a specific part of a living body, bleeding, mist at the time of using the energy treatment tool 5135, or the like by detecting the shape of an edge, a color, or the like of an object included in the image of the surgical site. The control section 5177 may cause the display device 5155 to display various surgery support information so as to be superimposed on the image of the surgical site by using a result of the recognition at the time of displaying the image of the surgical site on the display device 5155. By superimposing the surgery support information and presenting the surgery support information to the surgeon 5181, it becomes possible to proceed with the surgery more safely and reliably.

The transmission cable 5179 connecting the camera head 5119 and the CCU 5153 is an electric signal cable corresponding to electric signal communication, an optical fiber corresponding to optical communication, or a composite cable thereof.

Here, although wired communication using the transmission cable 5179 is performed in the example illustrated in the drawing, the communication between the camera head 5119 and the CCU 5153 may also be wireless communication. In a case where the communication between the camera head 5119 and the CCU 5153 is wireless communication, it is not necessary to lay the transmission cable 5179 in the surgery room. Therefore, such a situation that movement of a medical staff in the surgery room is disturbed by the transmission cable 5179 can be eliminated.

Hereinabove, an example of the surgery room system 5100 to which the technology according to the present disclosure can be applied has been described. Note that, although a case where a medical system to which the surgery room system 5100 is applied is the endoscopic surgery system 5113 has been described here as an example, the configuration of the surgery room system 5100 is not limited to such an example. For example, the surgery room system 5100 may be applied to a flexible endoscopic system for examination or a microsurgery system instead of the endoscopic surgery system 5113.

The technology according to the present disclosure, that is, the configuration and processing of the archive device, can be applied as the recorder 5105 or as a storage device connected to the recorder 5105 among the components described above.

7. Summary of Configuration of Present Disclosure

Hereinabove, the embodiments of the present disclosure have been described in detail with reference to a specific embodiment. However, it is obvious that those skilled in the art can make modifications and substitutions of the embodiments without departing from the scope of the present disclosure. That is, the present invention has been disclosed in the form of example, and should not be construed as limited to the example. The appended claims should be referred to in determining the gist of the present disclosure.

Note that the technology disclosed in the present specification can have the following configuration.

(1) An information processing device including:
a data processing section that performs a data recording processing control on a library which is a data storage section of an archive device,
in which the data processing section,
in response to a data recording request from an external device to the library,
saves record data in a local cache section and measures an elapsed time after saving the record data in the local cache section, and
records the record data from the local cache section in the library in a case where the elapsed time exceeds a predetermined postponement time.

(2) The information processing device according to (1), in which the data processing section outputs a recording processing completion notification to the external device after saving the record data in the local cache section.

(3) The information processing device according to (1) or (2), in which in a case where re-access of the external device to the record data is detected before the predetermined postponement time elapses after the record data is saved in the local cache section,
the data processing section resets measurement of the elapsed time and restarts elapsed time measurement after the re-access is completed.

(4) The information processing device according to any one of (1) to (3), in which in a case where re-access of the external device to the record data is detected while processing of recording the record data from the local cache section in the library is performed after the predetermined postponement time elapses,
the data processing section stops recording the record data, and restarts elapsed time measurement after the re-access is completed.

(5) The information processing device according to any one of (1) to (4), in which the data processing section generates directory information indicating a data structure of data saved in the library as information that is referenceable by the external device.

(6) The information processing device according to any one of (1) to (5), in which the predetermined postponement time includes a time that is pre-specified according to a data unit or a data type unit of record data.

(7) The information processing device according to any one of (1) to (6), in which the data processing section generates cache management data in which management information for each data recorded in the local cache section is recorded, and saves the cache management data in a memory.

(8) The information processing device according to (7), in which the data processing section records a library recording start permission flag indicating whether or not the postponement time has elapsed in the cache management data for each data recorded in the local cache section.

(9) The information processing device according to (7) or (8), in which the data processing section records an attribute identifier indicating whether or not transfer and recording of data to and in the library is completed in the cache management data for each data recorded in the local cache section.

(10) The information processing device according to any one of (1) to (9), in which the data processing section compares a data volume of new record data to be recorded in the local cache section with an available capacity of the local cache section, and in a case where the data volume of the new record data exceeds the available capacity of the local cache section, the data processing section selects data to be erased from recorded data in the local cache section according to a specified algorithm and erases the selected data.

(11) The information processing device according to (10), in which the data processing section determines whether or not data that has been transferred to and recorded in the library exists in the local cache section, and in a case where the data that has been transferred to and recorded in the library exists, the data processing section selects, as data to be erased, data whose elapsed time after being saved in the local cache section is longest.

(12) The information processing device according to (10) or (11), in which the data processing section determines whether or not data that has been transferred to and recorded in the library exists in the local cache section,
in a case where the data that has been transferred to and recorded in the library does not exist, the data processing section determines whether or not data whose transfer and recording to and in the library are currently performed exists in the local cache section, and
in a case where the data whose transfer and recording to and in the library are currently performed exists, the data processing section selects, as data to be erased, the data whose transfer and recording are currently performed after the data transfer and recording are completed.

(13) The information processing device according to any one of (10) to (12), in which the data processing section determines whether or not data that has been transferred to and recorded in the library exists in the local cache section,
in a case where the data that has been transferred to and recorded in the library does not exist, the data processing section determines whether or not data whose transfer and recording to and in the library are currently performed exists in the local cache section, and in a case where the data whose transfer and recording to and in the library are currently performed does not exist, the data processing section selects and erases data to be erased by applying a pre-specified erasure data selection algorithm.

(14) The information processing device according to (13), in which the erasure data selection algorithm includes First-in First-Out (FIFO) or least recently used (LRU).

(15) An information processing system including: an archive device and a user device that are communicable with each other,
  in which the user device outputs a data recording request to the archive device, and
  the archive device,
  in response to the data recording request from the user device,
  outputs a recording processing completion notification to the user device after saving record data in a local cache section and measures an elapsed time after saving the record data in the local cache section, and
  records the record data from the local cache section in the library in a case where the elapsed time exceeds a predetermined postponement time.

(16) The information processing system according to (15), in which in a case where re-access of an external device to the record data is detected after the record data is saved in the local cache section,
  the archive device resets measurement of the elapsed time and restarts elapsed time measurement after the re-access is completed.

(17) An information processing method performed in an archive device and causing a data processing section that is included in the archive device and performs a data recording processing control on a library which is a data storage section to perform:
  in response to a data recording request from an external device to the library,
  saving record data in a local cache section and measuring an elapsed time after saving the record data in the local cache section; and
  recording the record data from the local cache section in the library in a case where the elapsed time exceeds a predetermined postponement time.

(18) An information processing method performed in an information processing system including an archive device and a user device that are communicable with each other,
  in which the user device outputs a data recording request to the archive device, and
  the archive device,
  in response to an input of the data recording request from the user device,
  outputs a recording processing completion notification to the user device after saving record data in a local cache section and measures an elapsed time after saving the record data in the local cache section, and
  transfers the record data from the local cache section to the library to record the record data in the library in a case where a pre-specified postponement time elapses after saving the record data in the local cache section.

(19) A program causing an archive device to perform information processing and causing a data processing section that is included in the archive device and performs a data recording processing control on a library which is a data storage section to perform:
  in response to an input of a data recording request from an external device to the library,
  processing of saving record data in a local cache section and measuring an elapsed time after saving the record data in the local cache section; and
  processing of recording the record data from the local cache section in the library in a case where the elapsed time exceeds a predetermined postponement time.

In addition, the series of processing described in the specification can be performed by hardware, software, or a composite component thereof. In a case of performing the processing by using software, it is possible to install a program in which a processing sequence is recorded in a memory in a computer incorporated in exclusive-use hardware and execute the program. Alternatively, it is possible to install a program in a general-purpose computer capable of performing various processing, and execute the program. For example, the program can be pre-recorded on a recording medium. In addition to installing the program from a recording medium in a computer, the program can be received via a network such as a local area network (LAN) or the Internet and installed on a recording medium such as a built-in hard disk.

Note that the various processing described in the specification not only may be performed in a time series manner according to the description, but may also be performed in parallel or individually according to the processing performance of the device performing the processing, or as needed. Further, the system in the present specification may be a logical assembly of a plurality of devices, and the devices having respective configurations may be accommodated in the same housing, but are not limited thereto.

INDUSTRIAL APPLICABILITY

As described above, according to the configuration of an embodiment of the present disclosure, the configuration, in which access processing such as data recording from an external device to the archive device can be efficiently performed, is implemented.

Specifically, for example, the data processing section that performs a data recording processing control on a library, which is the data storage section of the archive device is provided. The data processing section saves record data in the local cache section in response to an input of the data recording request from the external device to the library, and outputs a recording processing completion notification to the external device. Further, an elapsed time after the saving in the local cache section is measured, and after the saving in the local cache section, the record data is transferred from the local cache section to the library and recorded after a pre-specified postponement time elapses.

With this configuration, the configuration, in which access processing such as data recording from an external device to the archive device can be efficiently performed, is implemented.

REFERENCE SIGNS LIST

10 Information processing system
20 User device
100 Archive device
101 Data processing section
102 Library
103 Library control section
104 Local cache section
105 Memory
106 Communication section
121 File system control section 122 Notification processing section
123 File manager GUI
124 Cache manager
125 Library processing section (REST client)
126 Library access section (REST API)
301 CPU
302 ROM
303 RAM
304 Bus
305 Input/output interface
306 Input section
307 Output section
308 Storage section
309 Communication section
310 Drive
311 Removable medium

The invention claimed is:

1. An information processing device, comprising:
a data processing section configured to:
control a data recording process on a library, wherein the library includes a data storage section of an archive device;
save first record data in a local cache section in response to a data recording request from an external device to the library;
measure an elapsed time after the first record data is saved in the local cache section;
record the first record data into the library from the local cache section in a case where the elapsed time exceeds a determined postponement time,
wherein the data recording process to record of the first data from the local cache section into the library is stopped, based on detection of re-access of the first record data at a time of execution of the data recording process;
compare a data volume of second record data to be recorded in the local cache section with an available capacity of the local cache section;
select specific data to be erased from the local cache section based on an erasure data selection algorithm in a case where a result of the comparison indicates that the data volume of the second record data exceeds the available capacity of the local cache section; and
erase the selected specific data from the local cache section.

2. The information processing device according to claim 1, wherein the data processing section is further configured to output a completion notification that indicates that the data recording process is completed to the external device after the first record data is saved in the local cache section.

3. The information processing device according to claim 1, wherein in a case where re-access of the external device to the first record data is detected before the determined postponement time elapses after the first record data is saved in the local cache section, the data processing section is further configured to:
reset the measurement of the elapsed time; and
restart the measurement of the elapsed time after the re-access is completed.

4. The information processing device according to claim 1, wherein in a case where re-access of the external device to the first record data is detected at a time of execution of the data recording process to record the first record data from the local cache section into the library after the determined postponement time elapses, the data processing section is further configured to:
restart the measurement of the elapsed time after the re-access is completed.

5. The information processing device according to claim 1, wherein the data processing section is further configured to generate directory information indicating a data structure of the first record data saved in the library as information that is referenceable by the external device.

6. The information processing device according to claim 1, wherein the determined postponement time includes a time that is pre-specified based on one of a data volume or a data type of the first record data.

7. The information processing device according to claim 1, wherein the data processing section is further configured to:
generate cache management data in which management information for each data recorded in the local cache section is recorded; and
save the cache management data in a memory.

8. The information processing device according to claim 7, wherein the data processing section is further configured to record a library recording start permission flag indicating whether the determined postponement time has elapsed in the cache management data for each data recorded in the local cache section.

9. The information processing device according to claim 7, wherein the data processing section is further configured to record an attribute identifier indicating whether transfer of the first record data to the library and record of the first record data into the library is completed in the cache management data for each data recorded in the local cache section.

10. The information processing device according to claim 1, wherein the data processing section is further configured to:
determine whether the first record data that has been transferred to the library and the first record data that is recorded in the library exists in the local cache section; and
select the specific data to be erased based on the elapsed time after being saved in the local cache section in a case where the first record data that has been transferred to and recorded in the library exists in the local cache section, wherein the elapsed time of the selected specific data is longest among data saved in the local cache section.

11. The information processing device according to claim 1, wherein the data processing section is further configured to:
determine whether the first record data that has been transferred to and recorded in the library exists in the local cache section;
determine whether the second record data which is currently transferred to the library and recorded in the library exists in the local cache section in a case where the first record data that has been transferred to the library and recorded in the library does not exist in the local cache section; and
select, as the specific data to be erased, the second record data, in a case where the second record data which is currently transferred to the library and recorded in the library exists in the local cache section, after completion of the transfer of the second record data to the library.

12. The information processing device according to claim 1, wherein the data processing section is further configured to:

determine whether the first record data that has been transferred to the library and recorded in the library at a first time exists in the local cache section;

determine whether the second record data which is currently transferred to and recorded in the library at a second time exists in the local cache section in a case where the first record data does not exist in the local cache section; and select and erase third record data based on an application of the erasure data selection algorithm in a case where the second record data does not exist in the local cache section.

13. The information processing device according to claim 12, wherein the erasure data selection algorithm includes one of First-in First-Out (FIFO) or least recently used (LRU).

14. An information processing method, comprising:

in an archive device:

controlling a data recording process on a library, wherein the library includes a data storage section of the archive device;

saving first record data in a local cache section in response to a data recording request from an external device to the library;

measuring an elapsed time after the first record data is saved in the local cache section;

recording the first record data into the library from the local cache section in a case where the elapsed time exceeds a determined postponement time, wherein the data recording process to record of the first data from the local cache section into the library is stopped, based on detection of re-access of the first record data at a time of execution of the data recording process;

comparing a data volume of second record data to be recorded in the local cache section with an available capacity of the local cache section;

selecting specific data to be erased from the local cache section based on an erasure data selection algorithm in a case where a result of the comparison indicates that the data volume of the second record data exceeds the available capacity of the local cache section; and erasing the selected specific data from the local cache section.

15. A non-transitory computer-readable medium having stored thereon, computer-executable instructions which, when executed by a processor, cause the processor to execute operations, the operations comprising:

in an archive device:

controlling a data recording process on a library, wherein the library includes a data storage section of the archive device;

saving first record data in a local cache section in response to a data recording request from an external device to the library;

measuring an elapsed time after the first record data is saved in the local cache section;

recording the first record data into the library from the local cache section in a case where the elapsed time exceeds a determined postponement time, wherein the data recording process to record of the first data from the local cache section into the library is stopped, based on detection of re-access of the first record data at a time of execution of the data recording process;

comparing a data volume of second record data to be recorded in the local cache section with an available capacity of the local cache section;

selecting specific data from the local cache section based on an erasure data selection algorithm in a case where a result of the comparison indicates that the data volume of the second record data exceeds the available capacity of the local cache section; and erasing the selected specific data from the local cache section.

* * * * *